(12) United States Patent
Rygaard

(10) Patent No.: US 10,259,598 B2
(45) Date of Patent: Apr. 16, 2019

(54) CONFORMAL AIRLOCK ASSEMBLY WITH SUPPORT RIBS AND METHOD

(71) Applicant: Christopher A. Rygaard, Huntsville, AL (US)

(72) Inventor: Christopher A. Rygaard, Huntsville, AL (US)

(73) Assignee: Christopher A. Rygaard, Huntsville, AL (US)

( * ) Notice: Subject to any disclaimer, the term of this patent is extended or adjusted under 35 U.S.C. 154(b) by 776 days.

(21) Appl. No.: 15/066,204

(22) Filed: Mar. 10, 2016

(65) Prior Publication Data

US 2016/0264267 A1    Sep. 15, 2016

Related U.S. Application Data

(60) Provisional application No. 62/133,024, filed on Mar. 13, 2015.

(51) Int. Cl.
*B64G 1/12* (2006.01)
*B64G 1/60* (2006.01)
*B64G 1/66* (2006.01)
*B64G 1/22* (2006.01)

(52) U.S. Cl.
CPC .............. *B64G 1/12* (2013.01); *B64G 1/60* (2013.01); *B64G 1/66* (2013.01); *B64G 2001/224* (2013.01)

(58) Field of Classification Search
CPC ... B64G 1/12; B64G 1/60; B64G 1/66; B64G 2001/224
See application file for complete search history.

(56) References Cited

U.S. PATENT DOCUMENTS

| 1,070,639 A | 8/1913 | Topper |
| 3,161,925 A | 12/1964 | Bertolini |
| 3,537,668 A | 11/1970 | Kosmo et al. |

(Continued)

FOREIGN PATENT DOCUMENTS

FR    1461529 A  *  2/1966  ............... B64G 1/52

*Primary Examiner* — Richard R. Green
*Assistant Examiner* — Michael B. Kreiner
(74) *Attorney, Agent, or Firm* — Beyer Law Group LLP

(57) ABSTRACT

A conformal airlock assembly for ingress and egress through a door from a high pressure environment to a low pressure environment. The airlock assembly includes a flexible, gas impermeable membrane that cooperates with a support wall in an airtight manner to form an interior pocket over the door on one side of the wall, and a distal-most rigid, rib structure generally disposed in said interior pocket. A gas displacement system, in flow communication with the interior pocket, is selectively operable to flow air out of the interior pocket, collapsing the membrane toward a deflated condition. An actuation system coupled to the distal-most rib structure is operable to displace the rib structure and the flexible membrane, in the deflated condition, away from the one side of the support wall, to a displaced condition. Such displacement of the airtight membrane creates a low pressure space in the pocket that is selected to be sufficiently proximate that of the low pressure environment. Hence, the door may be opened to permit ingress and egress therethrough without a large pressure differential.

19 Claims, 27 Drawing Sheets

(56) References Cited

U.S. PATENT DOCUMENTS

| | | | |
|---|---|---|---|
| 3,572,610 A * | 3/1971 | Paine | B64G 1/12 244/1 R |
| 3,639,934 A | 2/1972 | Eggert, Jr. | |
| 3,807,656 A * | 4/1974 | Fletcher | B64G 1/12 244/171.7 |
| 3,952,976 A | 4/1976 | Fletcher et al. | |
| 4,120,067 A | 10/1978 | Hone et al. | |
| 4,669,413 A | 6/1987 | Cummins | |
| 4,860,975 A | 8/1989 | Schliesing et al. | |
| 5,242,134 A * | 9/1993 | Petro | B64G 1/62 244/158.1 |
| 5,580,013 A | 12/1996 | Velke | |
| 6,499,697 B1 | 12/2002 | Patel et al. | |
| 6,786,456 B2 | 9/2004 | Veal et al. | |
| 6,857,956 B2 * | 2/2005 | Fuchs | E06B 5/14 454/195 |
| 7,237,524 B2 | 7/2007 | Pelrine et al. | |
| 7,997,537 B2 | 8/2011 | Rygaard | |
| 8,251,316 B2 | 8/2012 | Rygaard | |
| 8,899,233 B2 * | 12/2014 | Gurnee | A61G 10/026 128/205.26 |
| 2002/0190161 A1 * | 12/2002 | Patel | B64G 1/12 244/158.1 |
| 2012/0318926 A1 * | 12/2012 | Ingham | B64G 1/12 244/159.4 |

\* cited by examiner

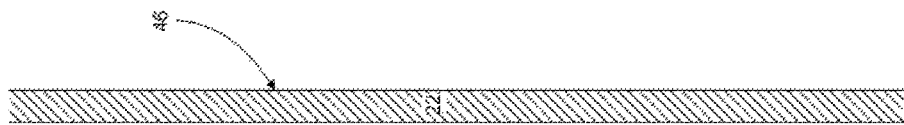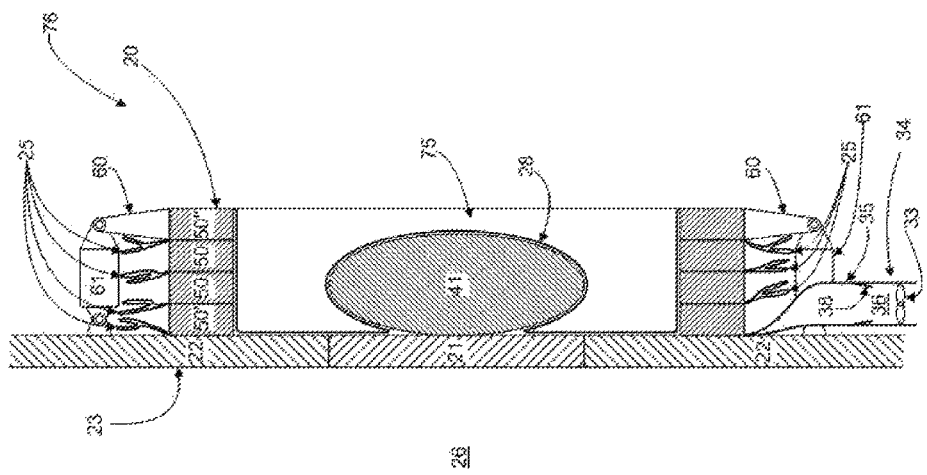
FIG._10

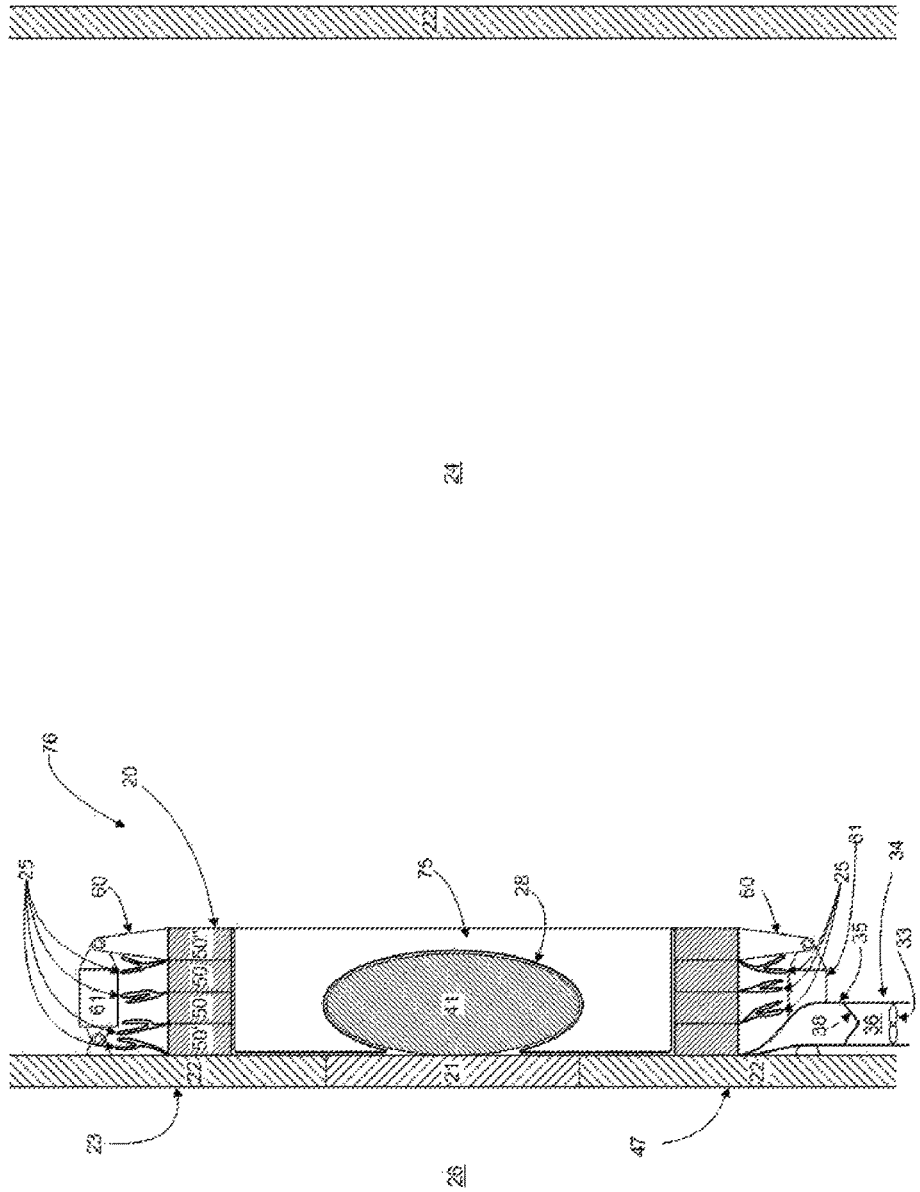
FIG_11

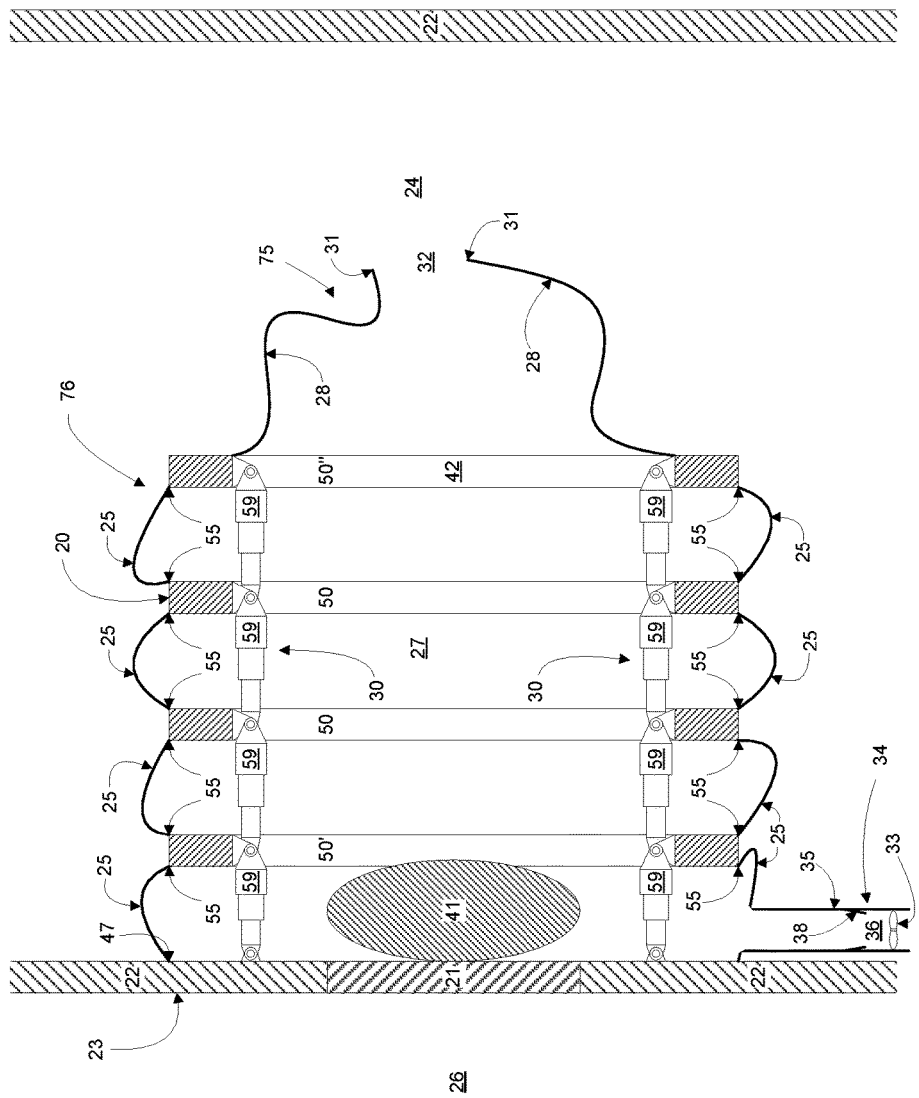
FIG._27

CONFORMAL AIRLOCK ASSEMBLY WITH SUPPORT RIBS AND METHOD

RELATED APPLICATION

This application claims priority to U.S. Provisional Patent Application No. 62/133,024, filed Mar. 13, 2015, entitled "CONFORMAL AIRLOCK ASSEMBLY WITH SUPPORT RIBS AND METHOD", which is herein incorporated by reference in its entirety for all purposes.

FIELD OF THE INVENTION

The present invention relates in general to an airlock assembly, and more particularly, to a conformal airlock assembly particularly suitable for manned spaceflight.

BACKGROUND OF THE INVENTION

Airlock assemblies have been used in space operations for human cargo space vehicles such as the U.S. Space Shuttle, as well as for space station entry and egress. Nearly all airlock assemblies are rigid wall structures that have a volume appropriate to the egress/ingress requirements of the items or humans to be accommodated. This type of rigid structure airlock is very time inefficient for ingress and egress, consumes space, expends excess energy, and loses a significant amount of air with each cycle.

Other airlock designs include shaped airlocks which are essentially a Rigid Chamber airlocks, except the rigid chamber is shaped to match the shape of the payload. By shaping the rigid chamber, the volume to be evacuated and pressurized during egress and ingress is reduced, thereby reducing the drawbacks of the Rigid Chamber airlock. However, with this design, the airlock is effective with only those items of a size and shape to match the rigid chamber.

Another airlock design is a Plastic Displacement airlock system which comprises a chamber and some plastic or fluid material that floods the chamber to displace the air. This greatly reduces the air lost on each cycle. However, the amount of plastic material required to flood the chamber can result in excess weight, and it is not clear how the plastic material can be controlled to prevent it from spilling into the interior or exterior of the vehicle.

Lastly, Suit Dock airlock systems have been designed which comprise a space suit and a docking mechanism between the space suit and the space vehicle. With this design, the suit never enters the vehicle, and the astronaut must climb out of the suit and through the dock to enter the vehicle. This design allows for better dust control, as when used on a planetary surface. It also reduces cycle time, energy consumption, and air loss. However, it is strictly limited to moving personnel into and out of the space vehicle.

More recently, a Conformal Airlock Assembly and Method have been developed, which is the subject of U.S. Pat. Nos. 7,997,537 and 8,251,316, filed Oct. 7, 2007 and Jul. 19, 2011, respectively, and herein both incorporated by reference in their entirety. While these conformal airlock inventions addressed many of the problems associated with the above-mentioned airlock designs, the volumetric space required to implement these airlocks is not suitable for extremely small interior spacecraft, especially where useable space is at a premium.

Accordingly, there is a need for a simple, compact airlock assembly and method for use in space operations where storage and living space is at a premium.

SUMMARY OF THE INVENTION

The present invention is directed toward a conformal airlock assembly to permit ingress and egress through a door of a support wall from a relatively high pressure environment on one side of the support wall to a relatively low pressure environment on the other side of the support wall. The airlock assembly includes a distal-most rigid, rib structure having a generally planar upper surface, an opposite, generally planar lower surface, a circumferential outer wall and a circumferential inner wall defining a rib interior space. The rib structure is generally disposed on the one side of the support wall. A flexible, gas impermeable membrane assembly is further provided that cooperates with the with the distal-most rib structure and the interior space to form an interior pocket over the door on the one side of the support wall. A first end portion of the membrane assembly further cooperates with the support wall in an airtight manner, and an opposite second end portion extends over said interior pocket defined by the upper surface of the distal-most rib structure.

An airtight resealable gateway assembly cooperates with at least one of the membrane assembly and the distal-most rib structure for selective operation between an open condition, permitting passage through an opening and into the interior pocket, and a closed condition, forming an airtight seal. A gas displacement system is oriented and positioned in flow communication with the interior pocket. This system is selectively operable to flow air into the interior pocket toward an inflated collapsed condition for the membrane assembly, and to flow air out of the interior pocket toward a deflated condition for the membrane assembly. An actuator apparatus is coupled to the distal-most rib structure, and operable to displace the flexible membrane and the plurality of rib structures, in the deflated condition, away from the one side of the support wall toward a displaced condition, creating a low pressure space, until the pressure differential between the low pressure created in the low pressure space and that on the other side of the support wall are sufficiently low so as to enable safe and free opening of the door to permit ingress and egress therethrough.

Accordingly, upon egress, the gas displacement system displaces air from inside the interior pocket of the membrane toward the collapsed condition. In this state, the membrane conforms around anything contained in the membrane, similar to vacuum packaging. Within the airtight interior pocket, the pressure is lowered further by operating the actuators, separating and displacing the conformed membrane, in the collapsed state, away from the support wall. This creates a low or negative pressure (i.e., a vacuum) within the interior pocket which is adjusted to be sufficiently proximate to that of the relatively low pressure environment on the other side of the support wall. The door, accordingly, can then be safely opened. Moreover, the plurality of ribbed or bellow structures enable the membrane assembly to functionally perform with an even smaller footprint than the conformal airlock designs disclosed in U.S. Pat. Nos. 7,997, 537 and 8,251,316.

In one specific embodiment, the conformal airlock assembly further includes a proximal-most rigid, rib structure having a generally planar upper surface, a respective opposite, planar lower surface, a circumferential outer wall and a circumferential inner wall defining a rib interior space. The rib structure is generally disposed in the interior pocket between the one side of the support wall and the distal-most rib structure. In the inflated condition, the distal-most rib structure and said proximal-most rib structure are spaced apart, and in the deflated condition, the distal-most rib structure and the proximal-most rib structure are in a stacked condition.

In another aspect of the present invention, a conformal airlock assembly is provided to permit ingress and egress through a door of a support wall from a relatively high pressure environment on one side of the support wall to a relatively low pressure environment on the other side of the support wall. The airlock assembly includes a plurality of separate, rigid, rib structures each having a generally planar upper surface, an opposite, generally planar lower surface, a respective circumferential outer wall and a respective circumferential inner wall defining a respective rib interior space. The rib structures are generally disposed on the one side of the support wall, and generally co-axially aligned with one another from a proximal-most rib structure to a distal-most rib structure of the plurality of rib structures. A flexible, gas impermeable membrane assembly is further provided that cooperates with the respective plurality of rib structures and their respective interior space to form an interior pocket over the door on the one side of the support wall. A first end portion of the membrane cooperates with the support wall in an airtight manner, and an opposite second end portion thereof extending over an opening into the interior pocket defined by the respective upper surface of the distal-most rib structure. An airtight resealable gateway assembly cooperates with the second end portion of the membrane assembly and the distal-most rib structure for selective operation between an open condition, permitting passage through the opening and into the interior pocket, and a closed condition, forming an airtight seal. A gas displacement system is oriented and positioned in flow communication with the interior pocket. This system is selectively operable to flow air into the interior pocket toward an inflated collapsed condition for the membrane assembly, wherein the plurality of rib structures are spaced apart, and to flow air out of the interior pocket toward a deflated condition for the membrane assembly, wherein the plurality of rib structures are in a stacked formation. An actuator apparatus is coupled to the distal-most rib structure, and operable to displace the flexible membrane and the plurality of rib structures, in the deflated condition, away from the one side of the support wall toward a displaced condition, creating a low pressure space, until the pressure differential between the low pressure created in the low pressure space and that on the other side of the support wall are sufficiently low so as to enable safe and free opening of the door to permit ingress and egress therethrough.

In one specific embodiment, the plurality of rib structure include at least two separate, rigid rib structures disposed between the proximal-most rib structure and the distal-most rib structure.

In another configuration, the gas impermeable membrane assembly includes a plurality of ring-shaped membrane sections. Each section includes one end mounted to a respective rib structure in an airtight manner, and an opposite end thereof mounted to a respective adjacent rib structure in an airtight manner. A proximal-most ring-shaped membrane section of the plurality includes the first end portion that cooperates with the support wall in the airtight manner, and an opposite end mounted to the proximal-most rib structure.

In yet another specific embodiment, the second end portion of the gas impermeable membrane assembly is mounted to the upper surface of the distal-most rib structure in an airtight manner surrounding the rib interior space thereof. The sealable gateway includes an airtight resealable seam cooperating with the second end portion membrane to form the opening into the interior pocket. The resealable seam is selectively operable from the open condition, permitting passage through the opening and into the interior pocket, to the closed condition, forming the airtight seal.

In another embodiment, the resealable seam is provided by one of a resealable airtight fabric edge fastener, fabric edge joiner, and interlocking tooth fastener device. The airtight resealable seam further includes one of an overlapping metallic hook system and an airtight hook and loop component.

Still another specific configuration provides the sealable gateway with a relatively rigid hatch frame hingeably mounted to the distal-most rib structure between the opened condition and the closed condition. In the closed condition, a generally planar lower surface of the hatch frame is airtight sealed to the upper surface of the distal most rib structure. The hatch frame further includes a generally planar upper surface, opposite the generally planar lower surface. A respective circumferential outer wall and a respective circumferential inner wall define a hatch interior space such that the hatch frame is generally co-axially aligned with the plurality of rib structures when oriented in the closed condition. Further, the second end portion of the gas impermeable membrane assembly is mounted to the upper surface of the hatch frame in an airtight manner surrounding the hatch interior space thereof.

In another specific embodiment, the actuator apparatus includes one or more actuator devices, each having one end coupled to the distal-most rib structure at spaced-apart locations thereof, and each having opposite ends fixedly mounted to a support structure to one of push and pull the membrane assembly. One end of the actuator devices is coupled to the distal-most rib structure from either inside the interior pocket to push the membrane assembly away from the door, to create the lower pressure space, or outside the interior pocket to pull the membrane assembly away from the door, to create the lower pressure space.

In still another specific configuration, the gas displacement system includes a 2-way valve to selectively permit the passage of air through the displacement system. The gas displacement system cooperates with one of the flexible membrane and the support wall to permit the flow of air therethrough.

BRIEF DESCRIPTION OF THE DRAWINGS

The assembly of the present invention has other objects and features of advantage which will be more readily apparent from the following description of the best mode of carrying out the invention and the appended claims, when taken in conjunction with the accompanying drawing, in which:

FIG. 10 is a fragmentary, side elevation view, in cross-section, of the conformal lock assembly of FIG. 9, illustrating the membrane in a deflated condition with the actuator devices in a retracted condition.

FIG. 11 is a fragmentary, side elevation view, in cross-section, of the conformal lock assembly of FIG. 10, illustrating a valve device of the gas displacement system in a closed condition.

FIG. 27 is a fragmentary, side elevation view, in cross-section, of still another alternative embodiment of the conformal lock assembly of FIG. 1, illustrating an object place within an interior pocket of the membrane.

DETAILED DESCRIPTION OF THE INVENTION

Figure 1:
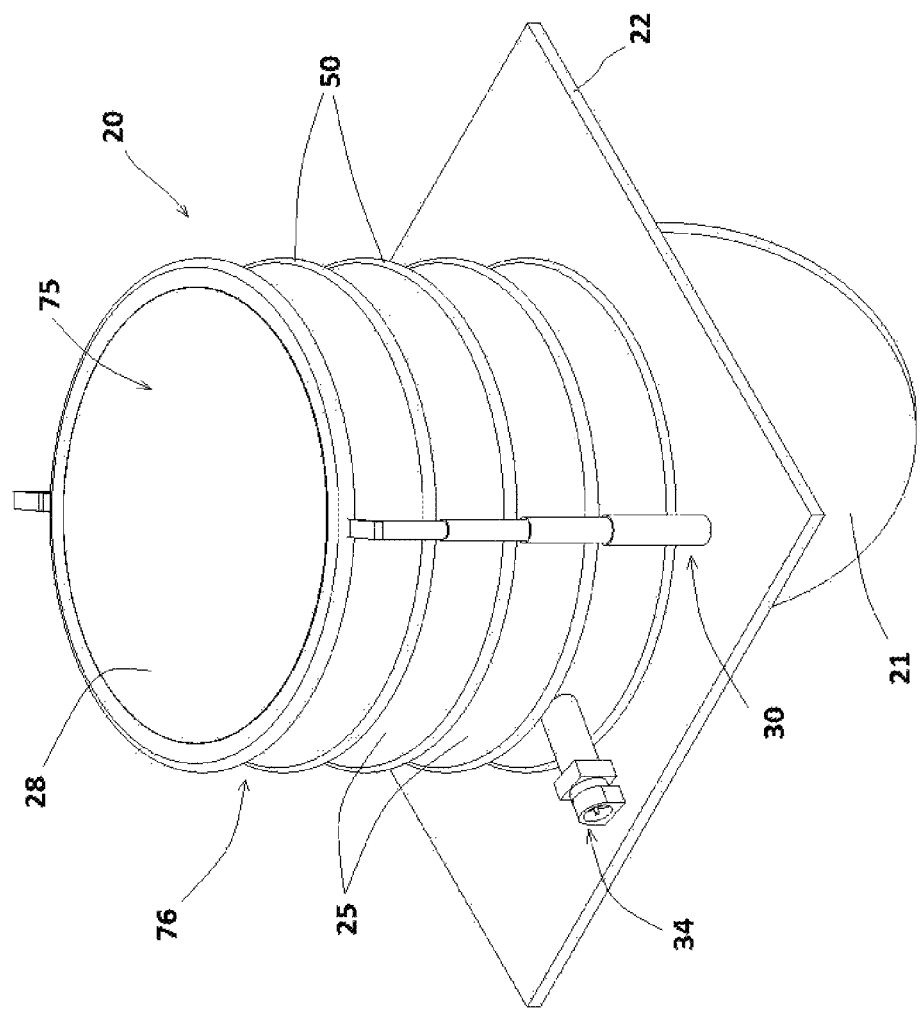
FIG. 1 is a top perspective view of a conformal lock assembly constructed in accordance with the present, and operationally mounted to a hull body of a spacecraft, with the hull door in an opened condition.
Figure 2:
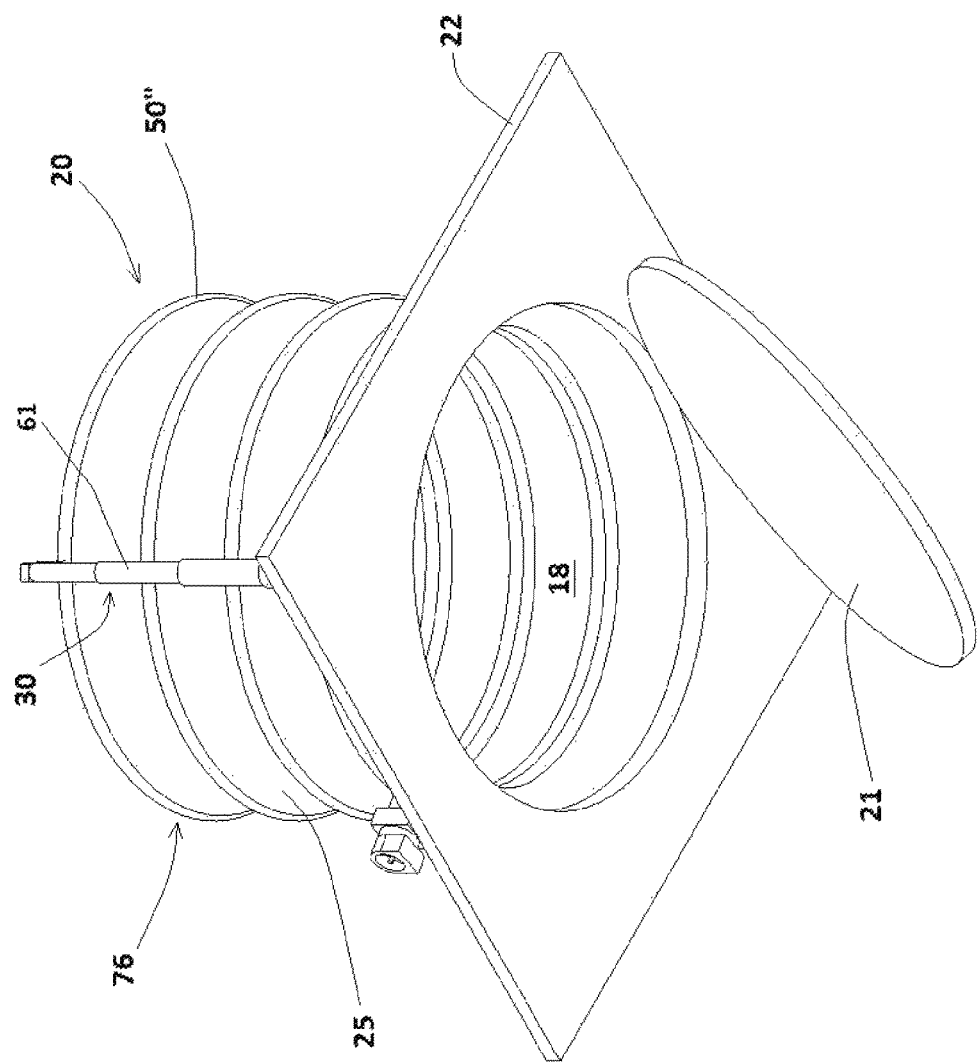
FIG. 2 is a bottom perspective view of the conformal lock assembly of FIG. 1.
Figure 3:
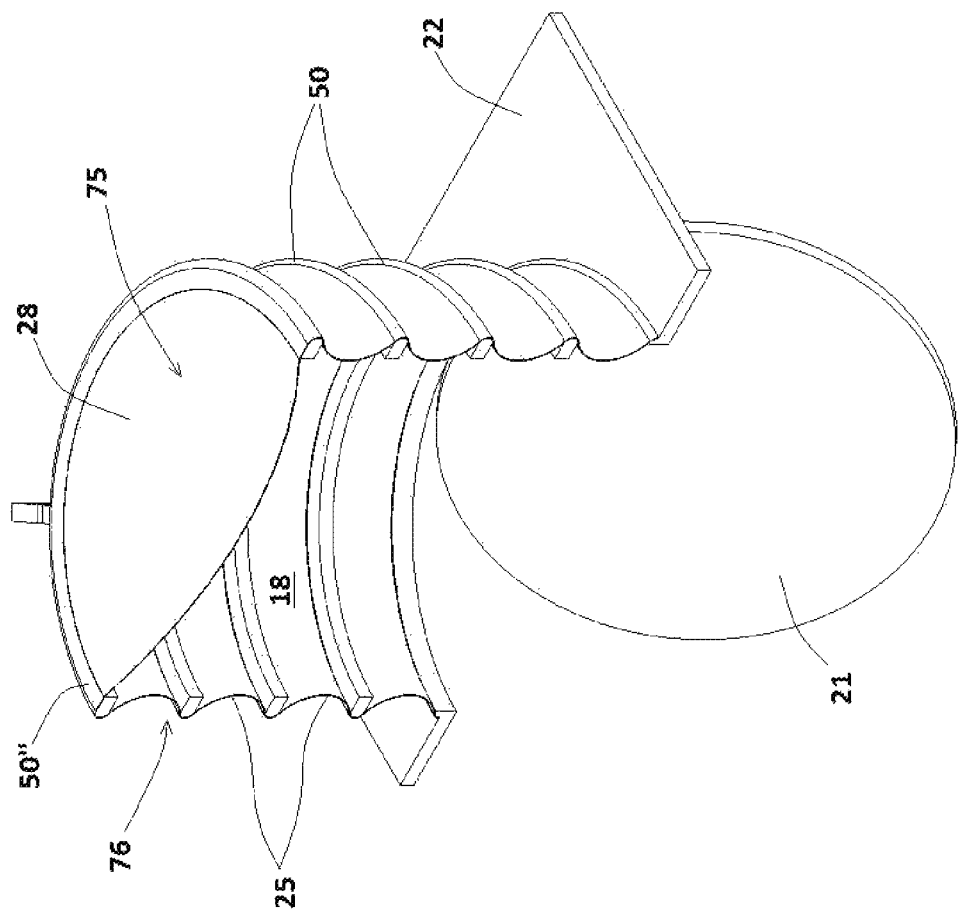
FIG. 3 is a fragmentary, top perspective view of the conformal lock assembly of FIG. 1.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Referring now to FIGS. 1-15, a conformal airlock assembly 20 is provided for ingress and egress through a door 21 of a support wall 22 (e.g., a hull wall of hull body 46 of a spacecraft 23) from a relatively high pressure environment 24 on one side of the support wall to a relatively low pressure environment 26 on the other side of the support wall. The airlock assembly 20 includes a plurality of separate, rigid, rib structures 50 (the plurality of which includes a proximal-most rib structure rib 50' and a distal-most rib structure 50") which are associated with one another, but are capable of limited free-floating or moving relative to one another, when in a spaced condition (FIGS. 1-3 and 6-8, as will be described). Each bellow or rib structure 50 includes a generally planar upper surface 70, an opposite, generally planar lower surface 71, a respective circumferential outer wall 72 and a respective circumferential inner wall 73 (FIG. 15) which defines a respective rib interior space 42 (i.e., generally a cylindrical shell should the rib structure be ring shaped. These rib structures 50 being generally disposed on the one side (interior side) of the support wall 22 (i.e., the high pressure environment 24), generally co-axially aligned with one another from a proximal-most rib structure 50' to a distal-most rib structure 50" of the plurality of rib structures from the support wall.

The airlock assembly 20 further includes a flexible, gas impermeable membrane assembly 76 cooperating with the respective plurality of rib structures 50 and their respective interior space 42 to form an interior pocket 27 around the door 21, on the one side of the support wall 22. The membrane assembly 76 further having a first end portion cooperating with the support wall to form an airtight seam 47, and an opposite second end portion 28 extending over or around the respective upper surface of the distal-most rib structure 50", controlling access to the respective interior space 42 and thus, the interior pocket 27.

A sealable gateway assembly 75 cooperates with the second end portion 28 of the membrane assembly 76 and the distal-most rib structure 50" for selective operation between an open condition (FIGS. 6 and 7), permitting passage through the respective interior space 42 and into the interior pocket 27, and a closed condition (FIG. 8-14), forming an airtight seal at the second end portion 28.

The conformal airlock assembly 20 further includes an actuation system, generally designated 30, which is coupled to the distal-most rib structure 50", and operable to displace the distal-most rib structure 50", the remaining plurality of rib structures 50, and thus the flexible membrane assembly 76 between a spaced condition (where the rib structures are spaced apart (FIGS. 1-3, 6-8 and 12-14)) and a stacked condition (where the rib structures are stacked upon one another (FIGS. 9-11)). The operation of this actuation system 30 will be described in more detail below.

Referring now to FIGS. 1, 4 and 6-10, a gas displacement system 34 is provided in flow communication with the interior pocket 27, and selectively operable to flow air into and out of the interior pocket. As will be described in greater detail below, when air is flowed into the interior pocket 27 toward an inflated condition of the membrane assembly 76 and with the actuation system 30 in the displaced condition (FIGS. 6-8), the flexible membrane assembly 76 can be essentially inflated such that the plurality of rib structures 50 are spaced apart, and float relatively free to one another. The membrane assembly is also pressurized to a level substantially close to that of the pressure on the interior of the hull.

When the actuation system 30 moves the plurality of rib structures 50 to the stacked condition (from FIG. 8 to FIG. 9), the rib structures are oriented in a co-axially stacked formation, providing space therebetween. Briefly, air can then be displaced out of the interior pocket 27, via gas displacement system 34, essentially deflating and depressurizing the membrane assembly 76 from the inflated condition (FIG. 9, although the rib structures are stacked) to the deflated condition (FIG. 10) where an upper portion of the flexible membrane assembly (generally second end 28) collapses and conforms around the object 41 within the interior pocket 27 therein.

Figure 12:
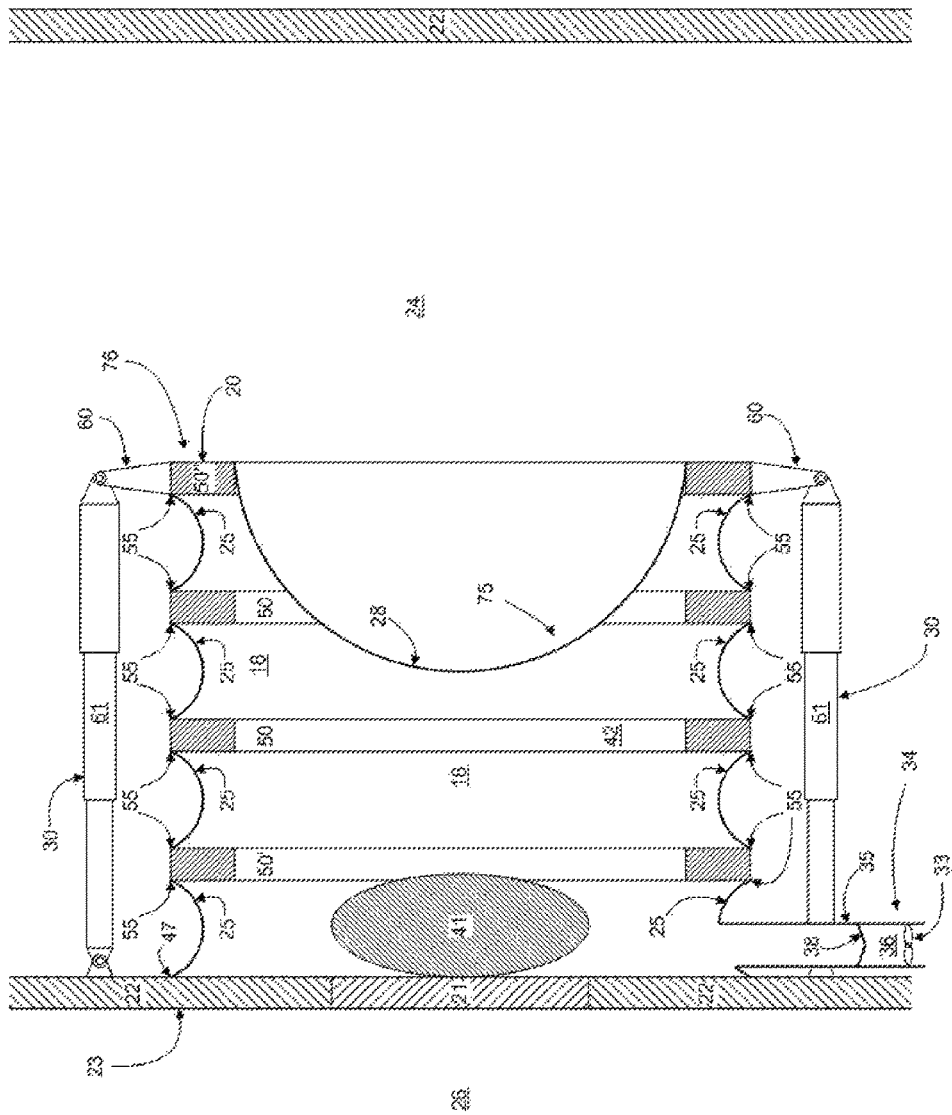
FIG. 12 is a fragmentary, side elevation view, in cross-section, of the conformal lock assembly of FIG. 11, illustrating operation of an actuation system to move the membrane from the deflated condition to a displaced condition.
Figure 13:
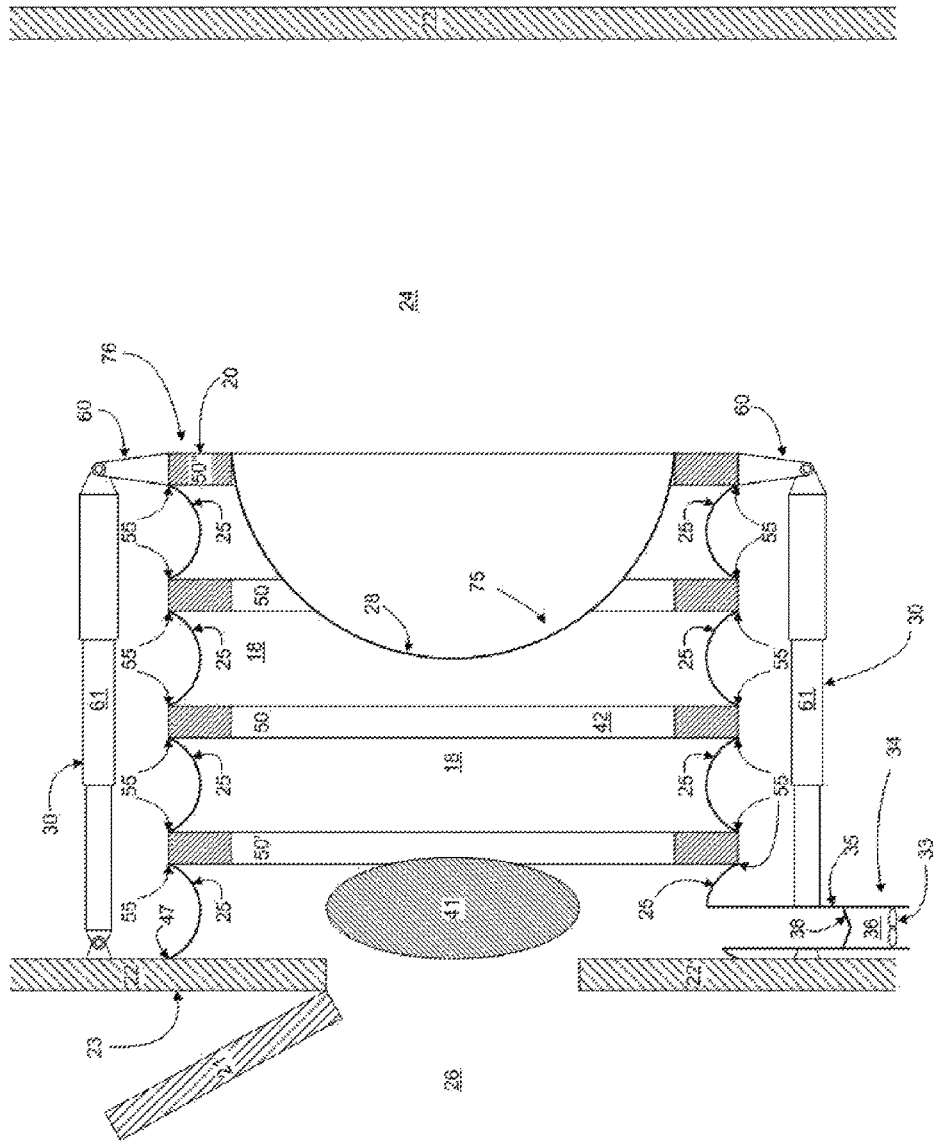
FIG. 13 is a fragmentary, side elevation view of the conformal lock assembly of FIG. 12, illustrating movement of the door to an opened condition.
Figure 14:
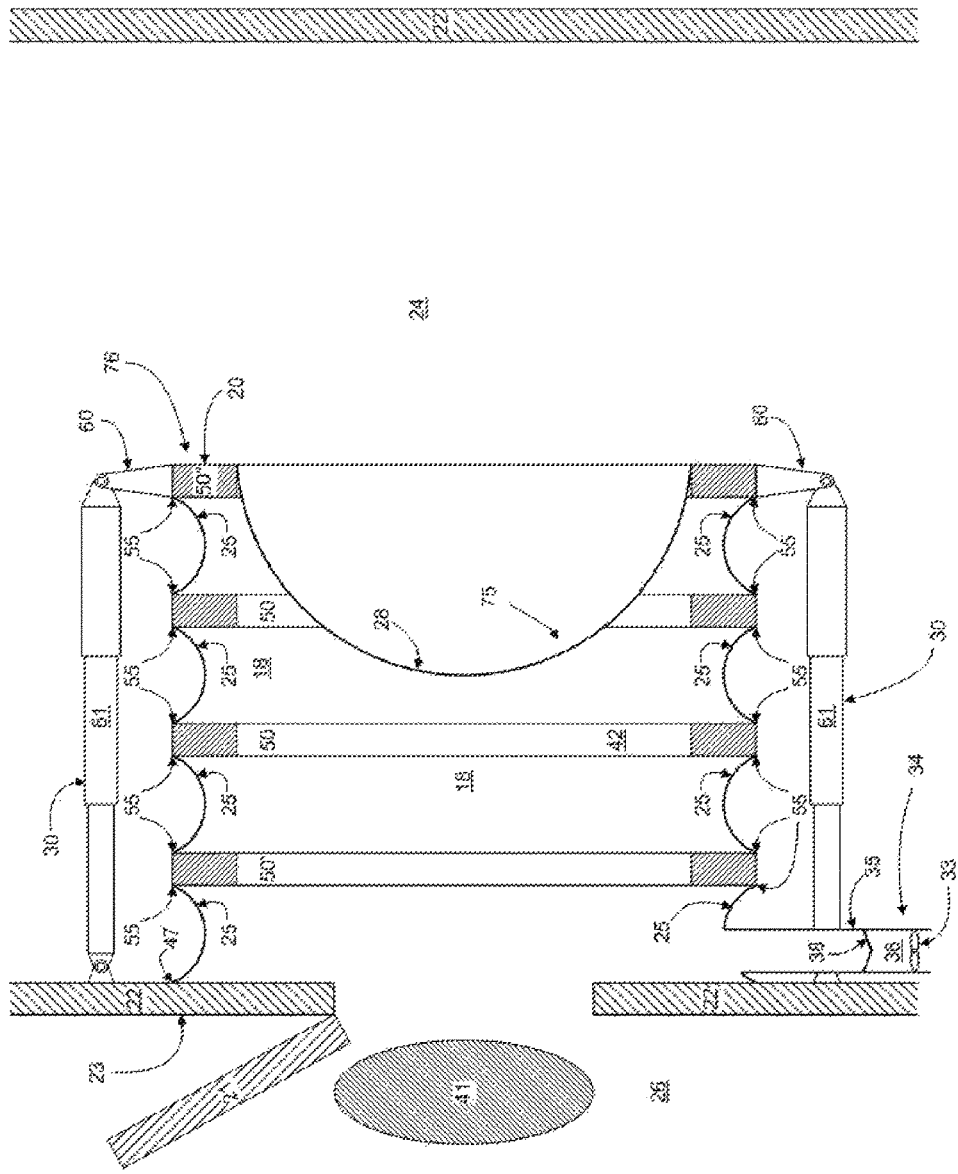
FIG. 14 is a fragmentary, side elevation view, in cross-section, of the conformal lock assembly of FIG. 13, illustrating egress of the object from the spacecraft.

Once in the deflated condition, the flexible membrane assembly 76, which is airtight sealed and conformed about object 41, door 21, as well as the interior walls of the rib structures 50 which define the respective interior spaces 42, is drawn away from the object 41 or door 21 to the displaced condition (FIG. 12), creating a low pressure space 18 and a vacuum or near vacuum therein. This is performed by the actuation system 30 which is coupled to the distal-most rib structure 50", and operable to displace the flexible membrane assembly 76, in the deflated condition, and the plurality of rib structures 50, in the stacked condition, away from the one side of the support wall 22 to the spaced condition (FIGS. 12-14). As the rib structures 50 move toward the spaced condition, they pull the membrane assembly 76, in the deflated condition, away from the support wall 22 and toward the displaced condition, creating the low pressure space 18 in the interior pocket 27. This displacement continues until the pressure within the interior pocket is sufficiently proximate to that of the relatively low pressure environment on the other side 26 of the support wall 22. When the low or negative pressure created inside the low pressure space 18 of the interior pocket 27 of the membrane is sufficiently close to that outside the hull or support wall 22, the door 21 may be safely opened to permit ingress and egress therethrough (FIGS. 13 and 14).

Accordingly, a conformal airlock assembly 20 is provided with a plurality of ribbed or bellow structures that enable the membrane assembly 76 to functionally perform with an even smaller footprint than that disclosed in U.S. Pat. Nos. 7,997,537 and 8,251,316. Current spacecraft designs are typically very cramped inside, leaving very little available space for maneuvering. The plurality of ribs/bellow structures 50 enable expansion of the interior pocket 27 of the membrane (i.e., generally coinciding with the collective shape of rib interior spaces 42, as compared to uniformly cylindrical rings, as shown) than would be available with the membrane just by itself, prior to deflation of the membrane assembly 76. Without the ribs/bellows, the flexible membrane would necessarily be quite wide just to develop a sufficient ingress space within the interior pocket 27 since the seam 47 must be placed sufficiently far from the payload to account for the bowed shape of the curtain or membrane during creation of the low pressure space.

The ribs/bellows, moreover, allow the airlock to be nearly any width, consuming significantly less functional space within the spacecraft. The rib structures, additionally, can be oddly shaped, conforming to whatever interior space could be provided within that particular spacecraft. The ribs can be used to facilitate control the shape of the extended airlock, potentially allowing portions of the interior pocket 27 to have convex or concave shape.

Moreover, a relatively simple and cost effective airlock is provided that can be easily altered to accommodate any application involving large pressure differentials. Other advantages include rapid ingress and egress, as well as reduced air loss and power consumption compared to other airlock systems.

Figure 15:
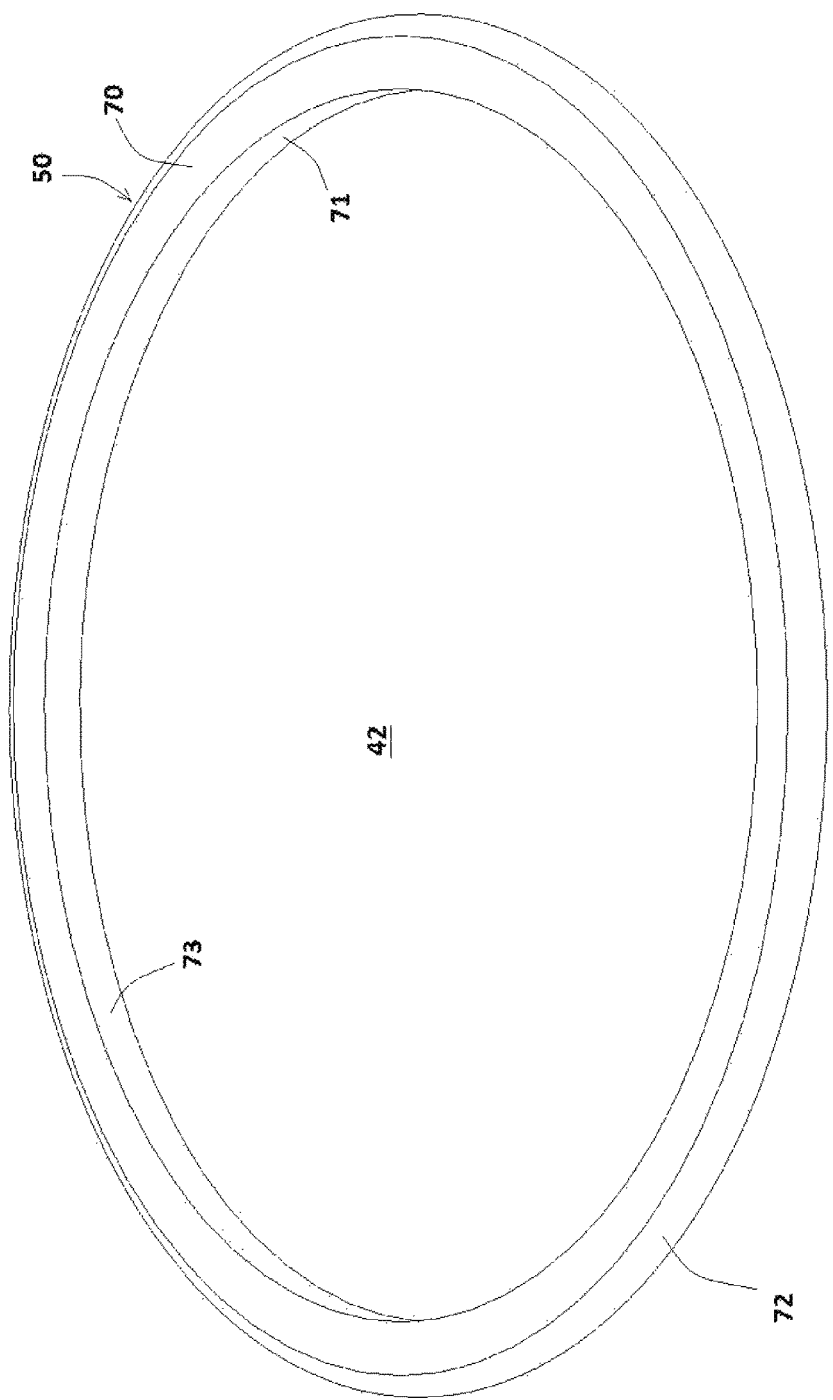
FIG. 15 is a top perspective view of a rib structure of the conformal lock assembly of FIG. 1.

As best shown in FIG. 15, these rigid ribs 50 are annular-shaped (albeit not necessarily cylindrical), having a relatively planar, upper surface 70, a generally parallel, relatively planar lower surface 71, a circumferential outer wall 72, and a circumferential inner wall 73 which defines the interior space 42. Moreover, it will be appreciated that while the rib structure of FIG. 15 is annular-shaped or cylindrical, the rib structure can be virtually almost any shape exterior circumferential shape as long as it can fit the designated payload in the interior pocket 27. The plurality of rib structures 50 may also be identically shaped to one another, or may be sequentially reduced or increased in size or differ slightly in shape from one rib structure to the next adjacent one (i.e., to conform with the designated interior space of the spacecraft). Moreover, the shape defined by the circumferential inner wall 73 need not be similarly shaped as that of the circumferential outer wall 72.

The rib structures are to be sufficiently rigid to withstand the severe pressure change environment, as well as be sufficiently stout (in composition and dimensional design) to accommodate the compression and tension forces exerted by the actuation system 30. In one specific embodiment, the material composition of the rib structure could be metallic, polymer based, or ceramic.

It will be appreciated, however, that the ribs themselves need not be fixed shape and size, but might be collapsible, such as a hinge mechanism that allows the ribs to be folded for stowage. Moreover, the ribs themselves might be composed of a closed membrane, perhaps a hollow toroidal shape, made rigid by inflating them at high pressure. Any fluid could be used to inflate the ribs, such as air or water.

While the present invention is shown and primarily described as having a plurality of rib structures 50', 50 and 50", it will further be appreciated that there could only be a single rib structure, the distal-most rib structure 50". Hence, this single rib structure embodiment, which is not shown by itself, would cooperate with the flexible membrane assembly and actuator assembly to move the distal-most rib structure, and thus, the membrane assembly toward the displaced condition.

Figure 6:
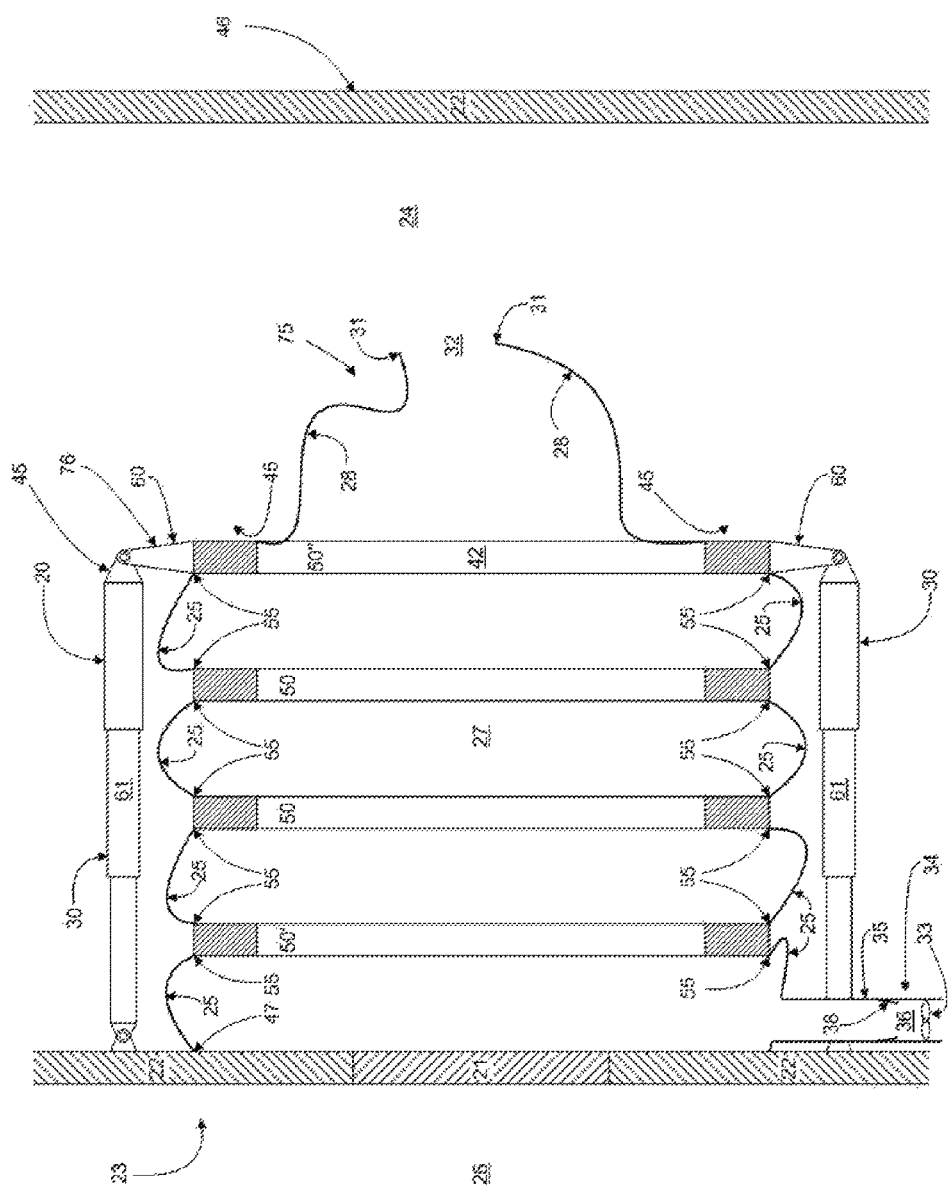
FIG. 6 is a fragmentary, side elevation view, in cross-section, of the conformal lock assembly of FIG. 1, illustrating a resealable seam for a membrane in an opened condition.
Figure 7:
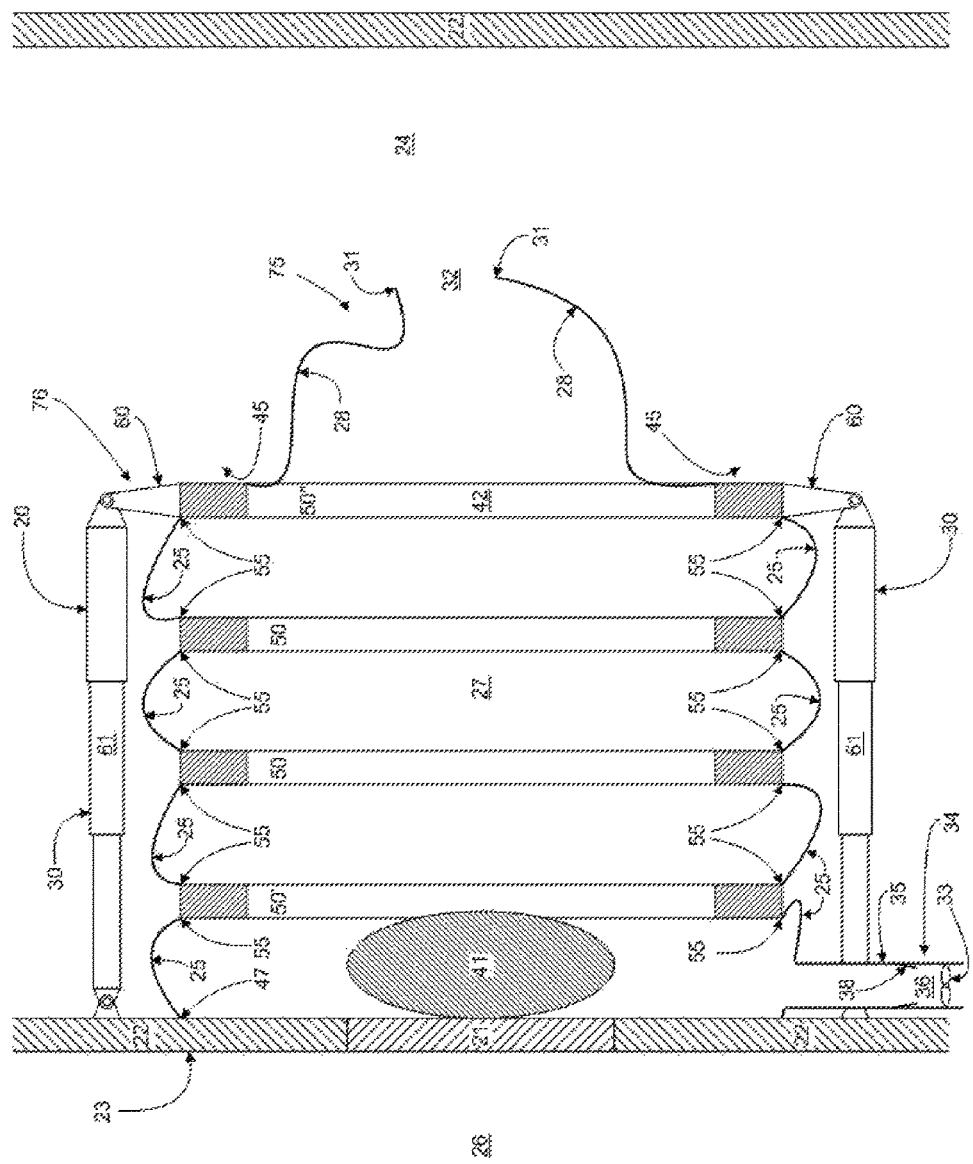
FIG. 7 is a fragmentary, side elevation view, in cross-section, of the conformal lock assembly of FIG. 6, illustrating an object placed within an interior pocket of the membrane.
Figure 8:
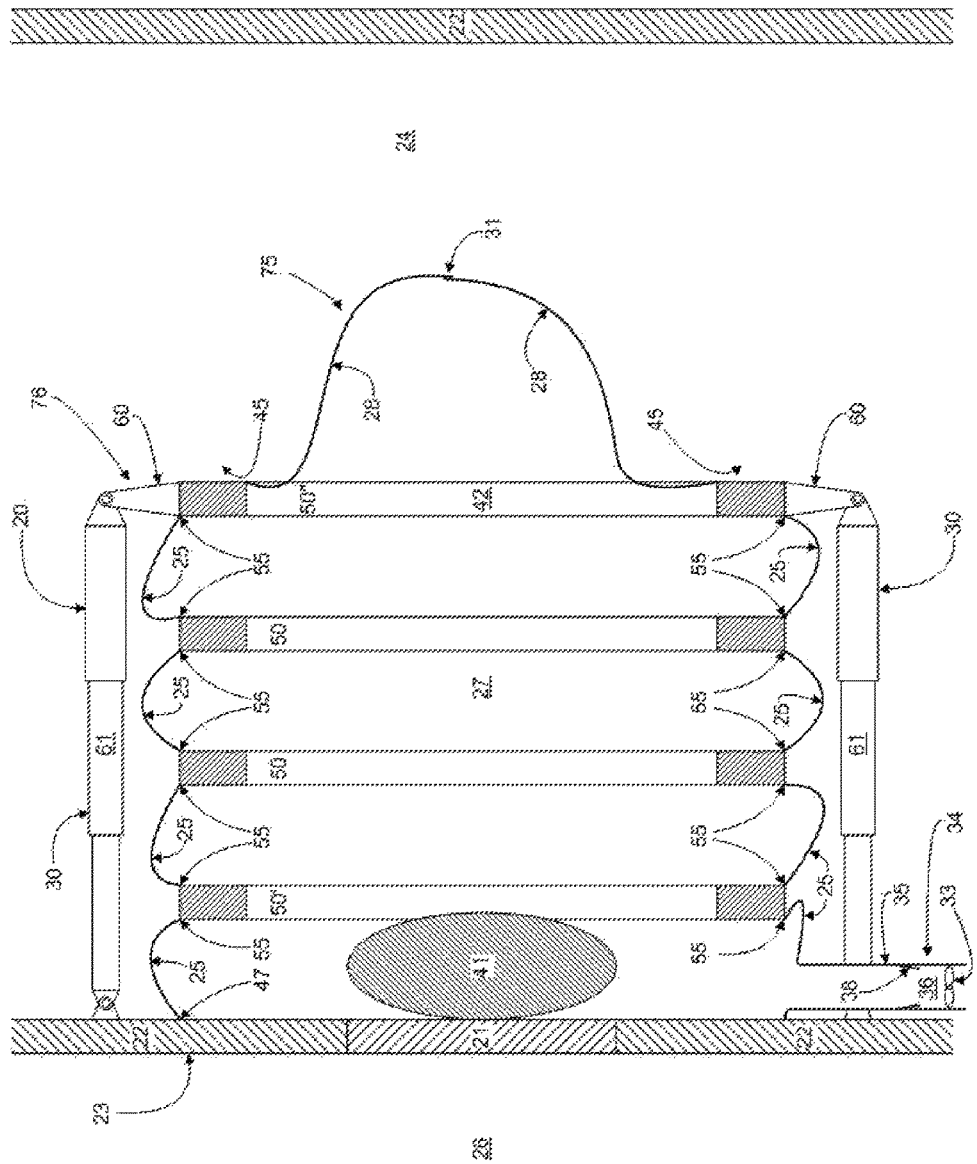
FIG. 8 is a fragmentary, side elevation view, in cross-section, of the conformal lock assembly of FIG. 7, illustrating the resealable seam in a closed condition.

In accordance with one specific embodiment the present invention, the plurality of floating rib structures 50 are integral with the membrane assembly 76 (FIGS. 6-14) such that the combination of both the membrane assembly 76 and the respective interior spaces 42 of the rib structures 50 collectively define the interior pocket 27, when the rib structures are in the spaced condition and the membrane assembly is in the inflated condition (FIGS. 6-8). The membrane assembly 76 includes a plurality of respective circumferential membrane sections 25 disposed between each adjacent rigid rib structure 50. This enables the respective rib structures 50 to have limited, albeit relatively free floating movement, while at the same time preventing unlimited axial separation therebetween.

As for the membrane sections 25 themselves, these annular components are composed of a gas impermeable or impervious material so that membrane assembly 76 can create an airtight interior pocket 27 in collective combination with the interior walls of the plurality of rib structures 50. The membrane assembly 76, as mentioned, must also be sufficiently flexible to provide the conformal interior pocket 27 provided by the second end portion 28 of the assembly.

The materials of the flexible membrane assembly 76 are also preferably non-elastic, although an elastic membrane may suffice. For instance, the membranes could be comprised of a plastic that should be sufficiently thick or have sufficient structural integrity so as to be capable of withstanding such larger pressure differentials in outer space, while at the same time be sufficiently thin or flexible to permit at least partial conformation around objects, in the deflated condition. Too thick or too nonflexible a membrane material is disadvantageous in that the ability to conform around the objects 41 in the interior pocket in the deflated condition is significantly reduced.

Briefly, it will be appreciated that while significant conformation about the object 41 in the membrane pocket 27 is desirable, in the deflated state, it need not be full conformation (as it is shown in FIGS. 10 and 11) as long as a sufficient low pressure can be created during movement of the membrane to the displaced condition.

Referring back to FIGS. 6-8, it is illustrated that that one circumferential end portion 55 of each annular membrane section 25 is to be mounted to the associated rib structure 50, forming an airtight seal therebetween, while an opposite circumferential end portion 55 of each membrane section 25 is to be mounted to the associated rib structure 50, also forming an airtight seal therebetween. Various conventional forms of airtight mounting techniques can be employed such as adhesives or clamping.

Similarly, to provide an airtight interior pocket 27, the proximal-most membrane section 25 and the wall 22 cooperate to form an airtight seal (seam 47) therebetween. Again, conventional airtight seam mounting techniques can be employed to form a circumferential seam 47 (FIG. 5), circumferentially surrounding door 21.

In accordance with this embodiment of the present invention, the flexible membrane assembly 76 includes one or more resealable seams 31 at the second end portion 28 that define an opening 32 into the interior pocket 27, via through interior space of the distal-most rib structure 50". This resealable seam 31 is movable between an opened condition (FIGS. 6 and 7), permitting ingress and egress through the opening, and a closed condition (FIGS. 3-9), providing a resealable airtight closure of the opening 32 at the second end portion 28 of the membrane assembly, and thus the interior pocket 27 of the airlock assembly 20. Hence, during operation of the gas displacement system 34 and/or the actuation system 30, the resealable seam 31 must be positioned in the closed condition, airtight sealing the interior pocket 27. In contrast, during ingress and egress to and from the interior pocket 27 of the membrane, the resealable seam is oriented in the opened condition, permitting passage through the opening 32.

It will be appreciated, of course, that the interior pocket 27 of the membrane should be pressurized, and at the inflated condition, before the resealable seam can be moved to the opened condition. Moreover, it will be understood that the resealable seam could be positioned between the support wall 22 and the proximal-most rib structure 50' or anywhere in the membrane.

This resealable seam 31 should be capable of sufficient structural integrity to withstand the pressure differential between the low pressure side outside 26 the spacecraft 23 and the high pressure side in the spacecraft interior 24, while at the same time be capable of forming a resealable airtight seal. The seam 31 includes an airtight resealable component capable of forming an airtight seal of the opening 32. Such a resealable airtight seam may be provided by an airtight ZIPLOCK® or ZIPPER-style component.

While this resealable zipper-style component is capable of providing an airtight seal, it may lack sufficient structural integrity to maintain a seal under this type of application and/or pressure differential conditions it may experience in space. Thus, to maintain structural integrity under these types of loads, the resealable seam 31 may include additional mechanical fasteners such as overlapping metallic hook system, VELCRO® component (similar to the overlapping VELCRO® systems disposed over zippers found in many coats), for example, that works in combination with the resealable zipper-type component.

Figure 4:
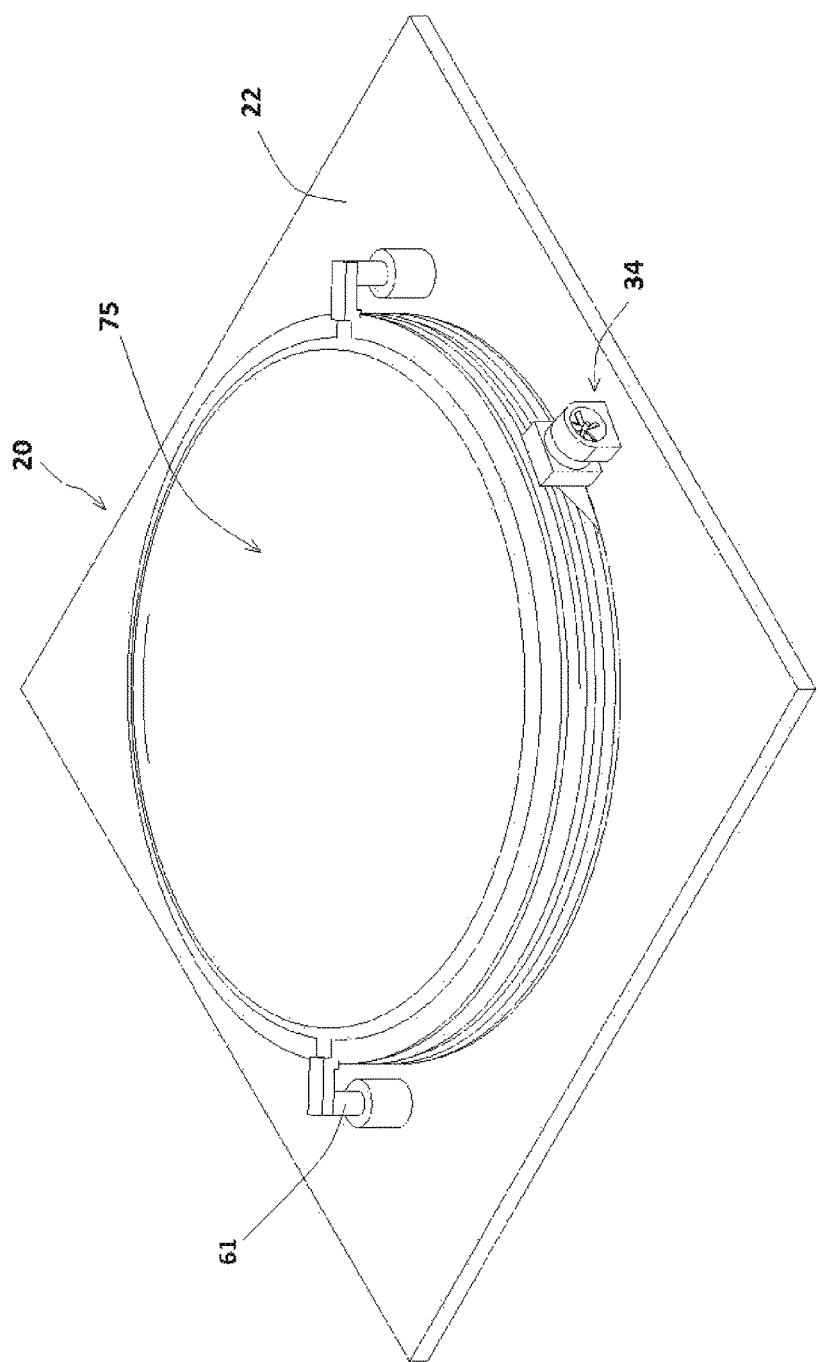
FIG. 4 is an enlarged, top perspective view of the conformal lock assembly of FIG. 1, in a deflated/stacked condition.
Figure 5:
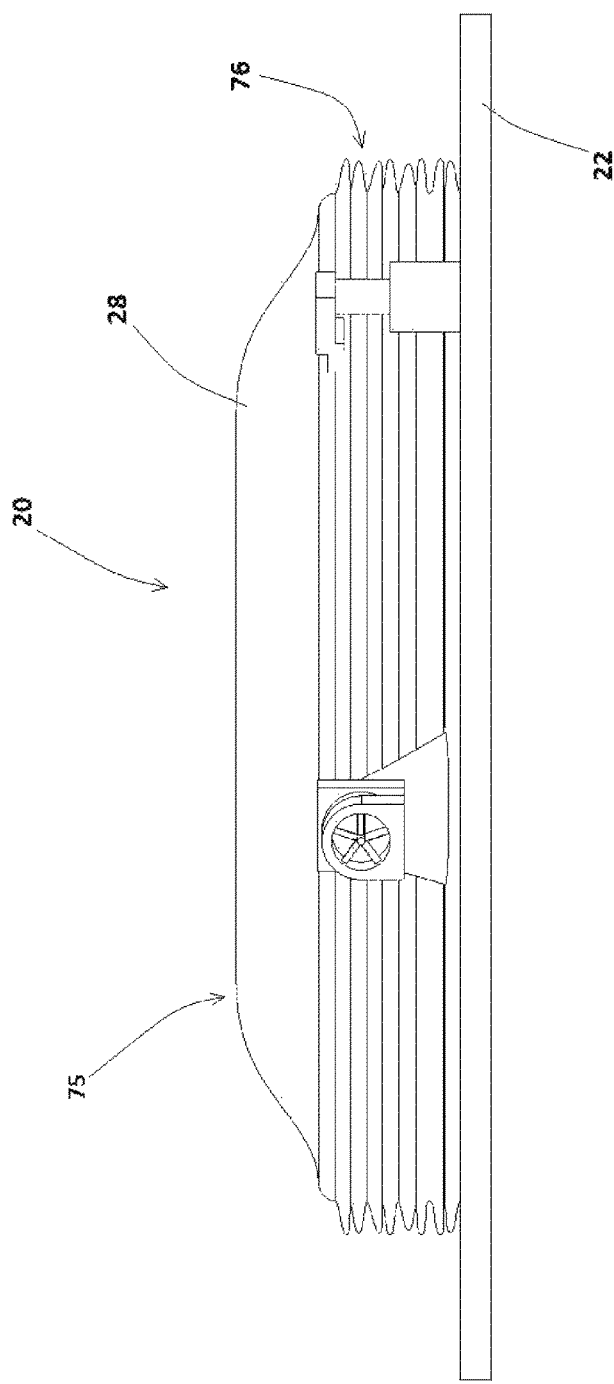
FIG. 5 is a side elevation view of the conformal lock assembly of FIG. 4.

Referring now to FIGS. 4, 5 and 8, the gas displacement system 34 of the airlock assembly 20 is shown which is employed to selectively displace gas into and out of the interior pocket 27 of the flexible membrane assembly 76, between the inflated condition (FIGS. 8 and 9) and the deflated condition (FIG. 10). This displacement system is in flow communication with the interior pocket 27 of the airtight membrane assembly 76 to generate, utilize, and/or apply a pressure differential. Generally, by generating a positive pressure differential between the interior pocket 27 of membrane assembly 76 and outside of the membrane (e.g., the interior 24 of the hull body 46), gases will tend to flow out of the interior pocket of the airlock assembly 20. In contrast, creating a negative pressure differential will cause gases to flow into the interior pocket 27.

In one specific embodiment, the gas displacement system 34 includes a body 35 having a communication passage 36 with one end in fluid communication with the interior pocket 27 of the airlock assembly 20, and an opposite end communicating outside of the interior pocket. The displacement system 34 further includes a low pressure fan or pump device 33, or the like, operably disposed in the passage 36. This fan or pump device 33 creates or generates gas displacement to and from the interior pocket 27 of the membrane assembly 76.

A fan with as little an output as about 0.005 PSI may be utilized, depending upon many factors such as the flexibility of the membrane, the desired capacity to collapse the membrane, etc.

Briefly, during operation of the gas displacement system 34 to move the flexible membrane toward the deflated condition from the inflated condition (e.g., just prior to ingress or egress through the door 21, as will be described), the fan or pump device 33 operates to flow gases through the communication passage 36 in one direction (shown by arrow 43 in FIG. 9). As the gas flows out of the interior pocket 27, the membrane deflates and depressurizes the environment therein. The membrane then conforms around anything contained in the interior pocket 27, similar to vacuum packaging. In contrast, to move the flexible membrane toward the deflated condition (e.g., just prior to opening of the resealable seam 31, as will be described), the fan or pump device 33 operates to flow gases through the communication passage 36 in the opposite direction, or the membrane could be inflated by opening the valve 38 and extending the ribs apart via the actuators. As the gas flows into of the interior pocket 27, the membrane assembly 76 inflates and pressurizes the environment therein.

While the displacement system 34 is shown and illustrated as being integrated into and through the membrane assembly 76, it will be appreciated that the system may be integrated into and through the support wall 22 or other part of the spacecraft 23. Moreover, the system may comprise multiple fans/pump devices as opposed to only one fan/pump device as shown.

To assure that no air leakage occurs through the displacement system passage, a valve device 38 may be positioned in flow communication with the passage 36 of the body 35 to regulate the flow of air therethrough. In an opened condition of the valve device 38 (FIGS. 6-10), the gaseous flow is permitted through the communication passage 36, while in a closed condition (FIGS. 11-14), the gaseous flow therethrough is blocked. The valve device 38 may be provided by any two-way valve. When the gas displacement system 34 utilizes a pump-type device as opposed to a fan device, such a valve device 38 may be unnecessary in some instances.

In accordance with the present invention, the airlock assembly 20 includes the actuation system 30 that is applied to displace the plurality of rib structures 50 in a direction away from the support wall 22 (surrounding door 21) toward the spaced condition (FIGS. 12-14), which in turn urges the flexible membrane assembly 76 from the deflated condition (FIG. 11) toward the displaced condition (FIG. 12). Consequently, the low pressure space 18 is formed, creating a negative pressure or vacuum within the interior pocket 27 thereof. As mentioned, such displacement the flexible membrane assembly 76 is in a direction away from the one side of the support or support wall 22, and into the interior cavity 24 of the hull body 46, and by an amount sufficient to drop the internal pressure of the low pressure space 18 to the level sufficiently proximate to that outside of the hull body (e.g., vacuum or near vacuum).

In the specific embodiment of FIGS. 1-14, the actuation system includes one or more extensor actuators 61, each having one end coupled to the outermost rib structure 50" in a spaced-apart manner at the corresponding attachment points 60, via link 45, and opposite ends anchored to the support wall 22 on the door-side (door 21) of the hull body 46.

More particularly, these extensor actuators 61 can be retracted to move the plurality of rib structures 50 to the stacked condition (FIGS. 4-6), and then can be extended to move the plurality of rib structures to the spaced condition (FIGS. 7, 8 and 12-14). In this manner, the outermost rib structure 50" is pushed away from the wall 22 and door 21, which in turn pulls the remaining rib structures 50, 50', via membrane sections 25, as well as second end section 28. This movement expands the interior pocket 27 (in the deflated condition), defined between the support wall 22 and the membrane assembly 76, and creates the low pressure/vacuum space 18 therein by such displacement (in the displaced condition).

Figure 9:
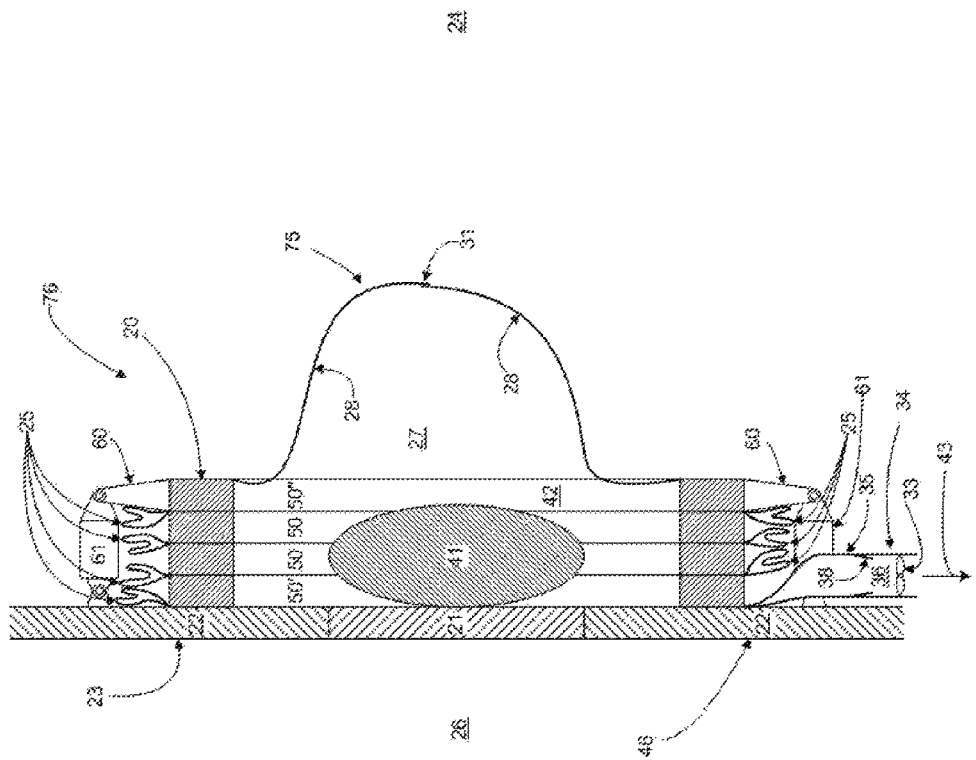
FIG. 9 is a fragmentary, side elevation view, in cross-section, of the conformal lock assembly of FIG. 8, illustrating operation of a gas displacement system and deflation of the membrane.

Briefly, referring now to FIG. 9, to create a vacuum within the interior pocket 27 of the airlock assembly 20 while the plurality of rib structures are in the stacked condition, the gas displacement system 34, via fan/pump device 33, is operated to draw gases from the interior pocket (in the direction of arrow 43) of the membrane assembly 76, toward the deflated condition (FIGS. 10 and 11). Once the membrane assembly 76 is collapsed, and conformed around the object 41 contained in the interior pocket 27 (the object 41, of course, is not required to be placed within the interior pocket 27 in order to create a vacuum), the valve device 38 is moved to the closed condition (FIG. 11), the interior pocket 27 is then maintained in the collapsed/deflated state and is airtight. The extensor actuators 61 are then operated to push the attachment points 60 away from the support wall 22 and door 21 (FIGS. 12-14), pulling the remaining rib structures 50, 50' and the membrane assembly 35 along therewith. Consequently, the created low pressure space 18 of the interior pocket 27 is expanded, creating a vacuum therein.

To better understand the operation of the present invention, the entire egress or exit procedure from the airlock assembly 20 will now described in detail. Referring back to FIG. 6, with the door 21 in the closed position and the actuation system 30 orienting the plurality of rib structures 50', 50, 50" in the spaced condition, the gas displacement system 34 is actuated, if necessary, to pressurize and inflate the interior pocket 27 of the membrane assembly 76 (i.e., the inflated condition) to a level substantially proximate that of the interior cavity 24 of the hull body 46, which further enables the rib structures 50', 50 to free float and separate.

Initially, this may be substantially performed by opening the 2-way valve 38 of the displacement system 34 (i.e., should the gas displacement system 34 include a fan device 33. In this manner, the resealable seam 31 of the membrane can be safely moved to the opened condition without a significant pressure differential between the interior pocket 27 and the interior cavity 24 of the hull body 46 outside of the membrane assembly 76.

Once the resealable seam has been moved to the opened condition, the object 41 can be placed through the opening 32, and into the expanded interior pocket 27 of the membrane assembly 76. The object is preferably placed in the interior pocket 27. While the illustrations show positioning of the object near or adjacent the backside of the door 21 (FIG. 7), the object 41 may be positioned anywhere within the membrane pocket, in the inflated condition.

Referring now to FIG. 8, the airtight resealable seam 31 is moved to a sealed closed condition, airtight sealing the interior pocket 27 from the interior cavity 24 of the hull body 46. Next the actuation system 30 causes the plurality rib structures 50 to stack axially upon one another in the stacked condition (retracting extensor actuators 61 in FIG. 9), reducing the size of the interior pocket 27. The gas displacement system 34 can then be actuated together with the valve device 38 in the opened condition. For example, as shown in FIG. 9, the fan device 33 is actuated, moving the air in the direction of arrow 43, drawing gases out of the interior pocket 27 and deflating the membrane assembly 76, allowing full conformity of the membrane assembly 76 about the object 41 toward the deflated condition. It will be appreciated that if a two-way actuator is used, such as a screw jack or a double-acting ram, the actuators can assist in this process.

Once the membrane assembly 76 is fully deflated and depressurized by the fan device 33 (in the deflated condition), the flexible membrane assembly 76 conforms around the object 41 to be moved (FIG. 10), similar to vacuum packaging. Subsequently, to airtight seal the interior pocket and maintain the deflated nature of the membrane assembly 76, the 2-way valve 38 is moved from the opened condition to the closed condition (FIG. 11).

In accordance with the present invention, the airlock assembly 20 is now in condition to depressurize the interior pocket 27. Referring now to FIGS. 11 and 12, the extensor actuators 61 can be actuated and extended, pushing the distal-most rib structure 50″ of the membrane assembly 76 away from the door 21 and support wall 22. In turn, the remaining rib structures are also pulled apart, via extending of the intervening membrane sections 25 therebetween. As the membrane assembly is expanded to the displaced condition, the low pressure interior space 18 within the interior pocket 27 of the membrane assembly 76 is increased as well. Due to the sealed, deflated, near vacuum state the membrane assembly 76, in the deflated, displacing portions of the membrane assembly 76 away from the door 21 and support wall 22, to the displaced condition, creates a vacuum in the interior pocket 27 between the support wall 22 and the membrane assembly 76.

Each extensor actuator 61 may be operated independently and/or displace the respective portions of the distal-most rib structure 50″ away from the hull wall different distances. It is the total volume of the low pressure space 18, in the displaced condition that determines level of the negative pressure or vacuum created. That is, it is preferable to displace the membrane assembly 76 a sufficient distance away from the door 21 and the support wall 22 in order to create a vacuum approximate or similar to the low pressure outside 26 of the support wall 22. In other words, the pressure differential between the low pressure created in the low pressure space and that outside the hull body must be sufficiently low so as to enable safe and free opening of the door 21.

Once the created negative pressure is within a safe pressure differential with that outside the hull body (e.g., vacuum or near vacuum), the door 21 can then be safely and freely opened. In effect, interior cavity 24 of the spacecraft 23 is isolated from the exterior 26 thereof (FIG. 13). Subsequently, as best viewed in FIG. 14, the object 41 can then be removed from the craft.

For ingress through the airlock assembly 20 of the present invention, it is operated essentially in a manner reverse to the steps for egress. First, if the airlock assembly 20 was not just previously used for egress therefrom, with the door 21 closed, the resealable seam 31 must be moved to the closed condition, forming an airtight seal thereat. The actuation system 30 is then actuated, stacking the plurality of rib structures 50′, 50 and 50″ atop one another, from the spaced condition to the stacked condition. The gas displacement system 34 is then operated to flow gases out of the interior pocket 27, collapsing the membrane assembly 76 from the inflated condition to the deflated condition. With the valve device 38 in the opened condition, the fan device 33 is operated to remove gas from the interior pocket 27, depressurizing the flexible membrane assembly 76.

The valve device 38 is subsequently moved from the opened condition to the closed condition, wherein the actuation system 30 is now ready to operate to create the proper vacuum therein. As indicated, the extensor actuators 61 are actuated to displace the distal-most rib structure 50″ away from the door 21 and support wall 22 which, in turn, pulls the trailing rib structures thereafter. Simultaneously, the membrane assembly 76 is collectively pushed away from the support wall 22, from the deflated condition to the displaced condition. The low pressure space 18 within the collapsed interior pocket 27, of course, is increased, creating a vacuum as well as providing room within the membrane interior pocket 27 for entrance therein.

Once the proper low pressure is created, substantially proximate to that outside the support wall 22, the door 21 can be opened, as shown in FIG. 14. Incidentally, if the airlock assembly 20 was just previously used for egress therefrom, with the door 21 still in the opened condition (FIGS. 13 and 14), the ingress procedure would commence here.

Either way, the object 41 can be moved through the door 21 and into the operational volume 18 of the membrane, as best viewed in FIG. 13. With the extensor actuators 61 already displacing the membrane assembly 76 away for the support wall 22, in the displaced condition, a sufficient low pressure space 18 is created in the collapsed interior pocket for ingress therein.

Referring back to FIG. 12, the door 21 can then be closed, sealing the interior cavity of the hull body 46 from the outside of the craft. The extensor actuators 61 can then be operated (retracted in FIG. 11) to allow the rib structure 50 to stack, and membrane assembly 76 to collapse back toward the door 21 and support wall 22, to the deflated condition, dissipating the generated vacuum.

The valve device 38 is then moved from the closed condition to the opened condition (FIG. 10), permitting gas flow through the communication passageway 36 of the gas displacement system 34. Moreover, the fan device 33 or pump device of the gas displacement system 34 can be operated to inflate the membrane assembly 76 from the deflated condition (FIG. 10) toward the inflated condition (FIG. 9) until the pressure within the interior pocket 27 is substantially equal to that of the spacecraft interior 24.

Subsequently, the extensor actuators 61 can be extended to move the plurality of rib structures to the spaced condition (FIG. 8). The resealable seam 31 can then be moved from the sealed closed condition to the opened condition (FIG. 7), allowing the object 41 to be removed from the interior pocket 27 of the membrane assembly 76, via the opening 32 of the seam.

Figure 16:
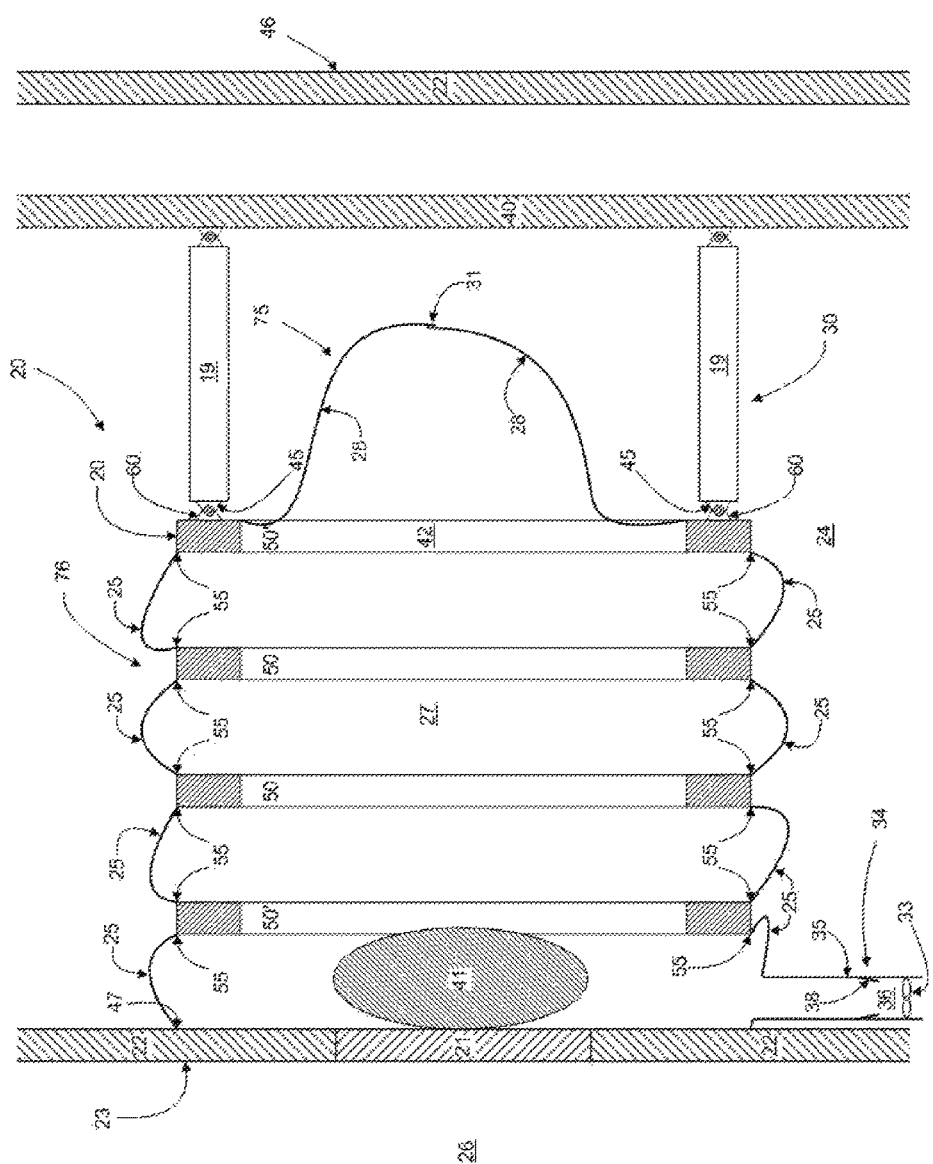
FIG. 16 is a fragmentary, side elevation view, in cross-section, of the conformal lock assembly of FIG. 1 with an alternative embodiment actuation system, illustrating the resealable seam in a closed condition.
Figure 17:
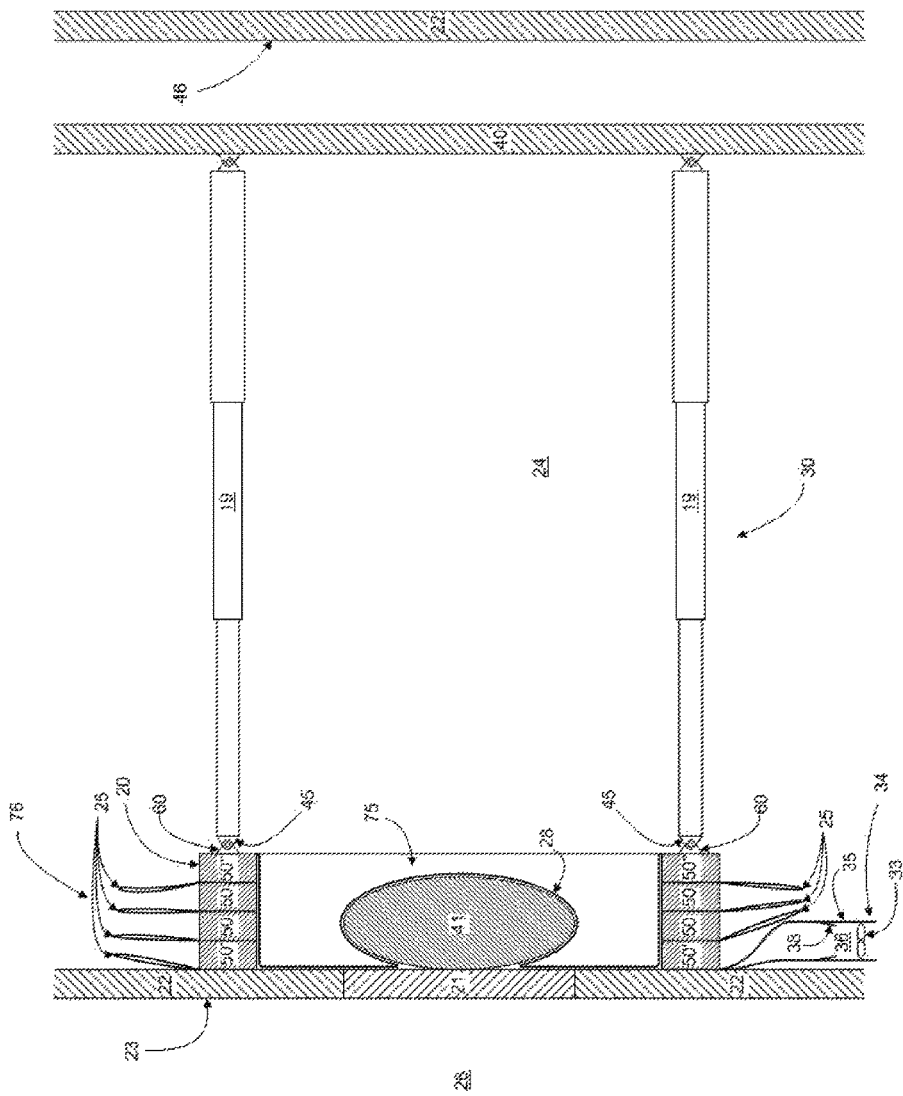
FIG. 17 is a fragmentary, side elevation view, in cross-section, of the conformal lock assembly of FIG. 16, illustrating the membrane in the deflated condition with the actuator devices in a extended condition.
Figure 18:
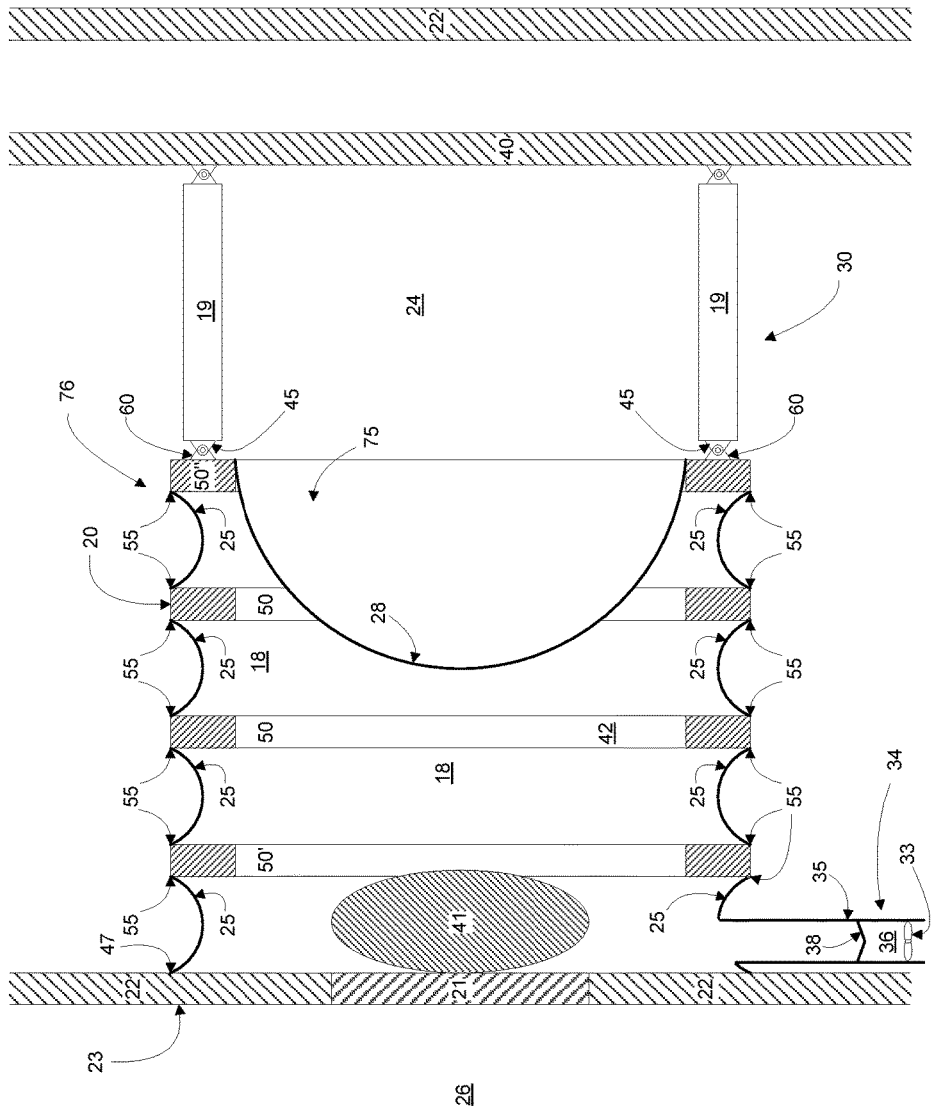
FIG. 18 is a fragmentary, side elevation view, in cross-section, of the conformal lock assembly of FIG. 17, illustrating operation of an actuation system to move the membrane from the deflated condition to a displaced condition.
Figure 19:
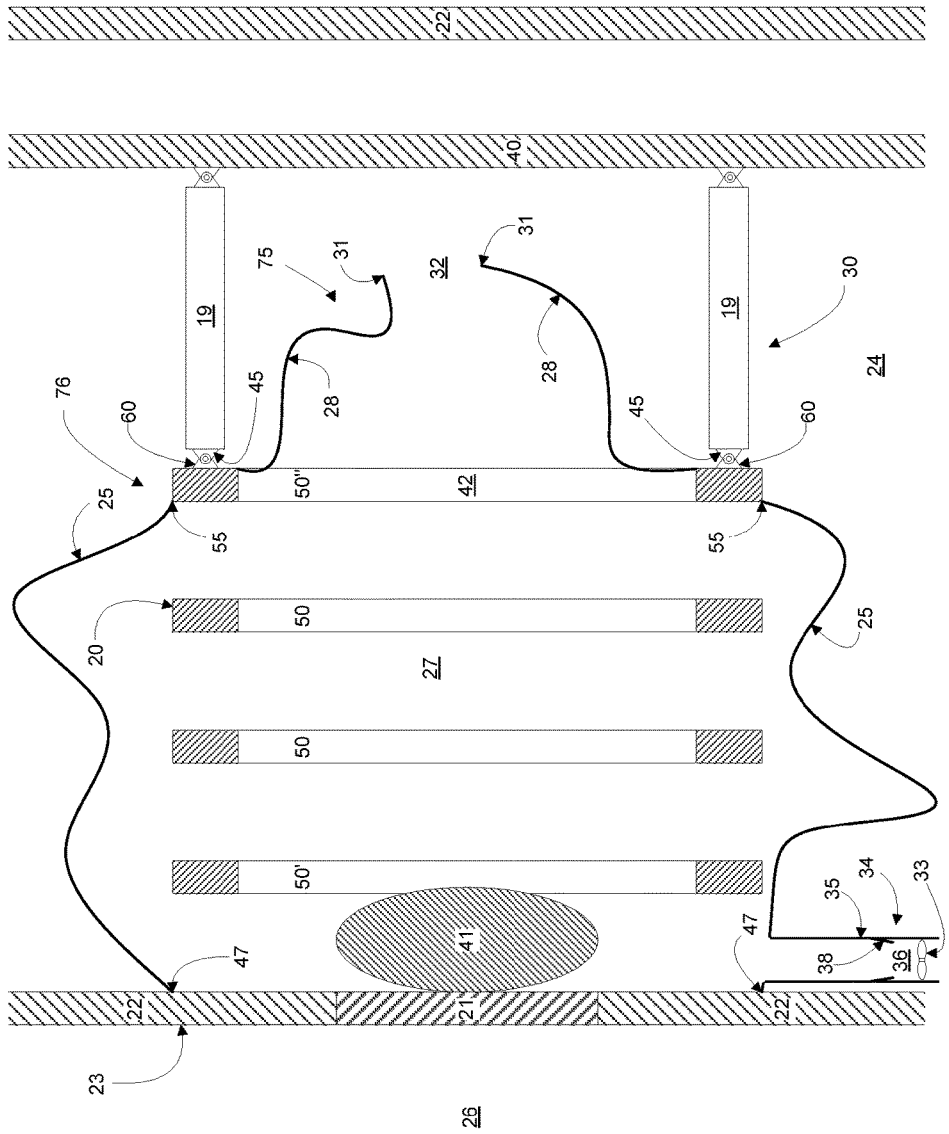
FIG. 19 is a fragmentary, side elevation view, in cross-section, of an alternative embodiment of the conformal lock assembly of FIG. 1, illustrating an object placed within an interior pocket of the membrane.
Figure 20:
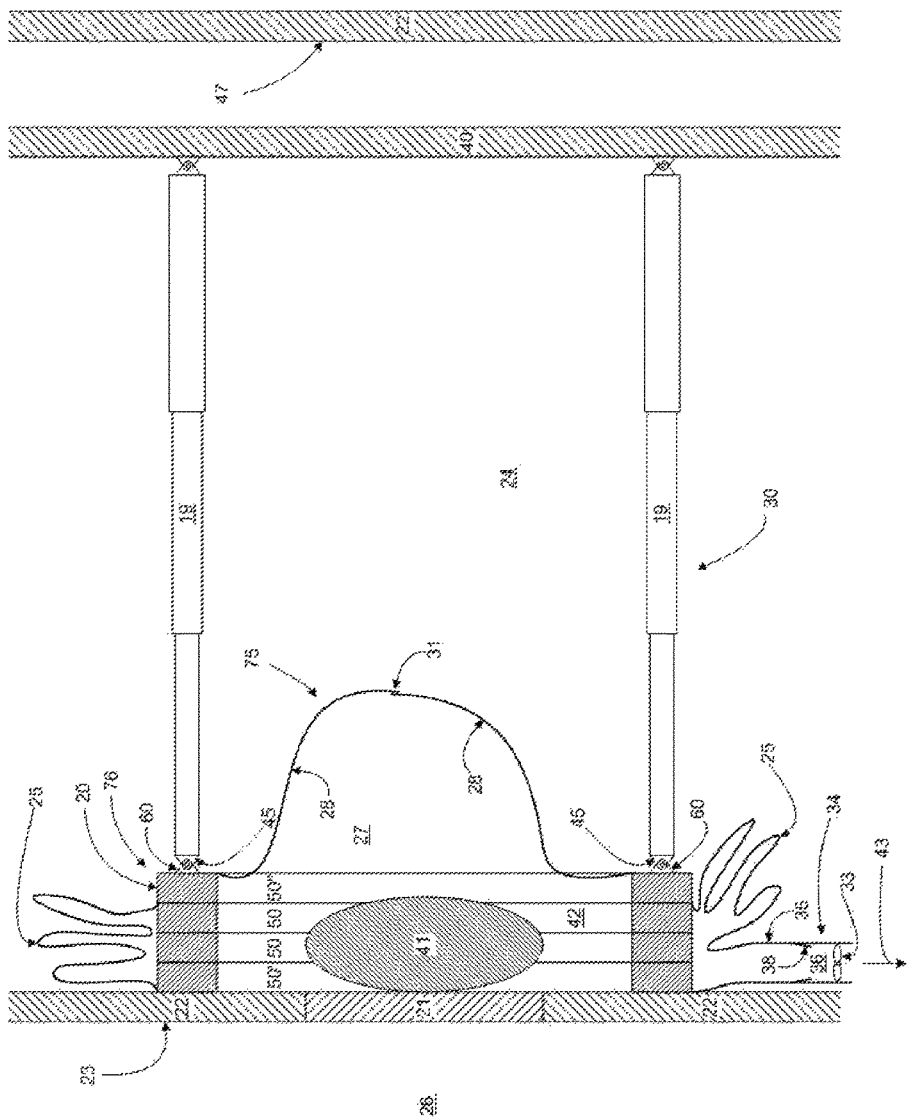
FIG. 20 is a fragmentary, side elevation view, in cross-section, of the conformal lock assembly of FIG. 19, illustrating operation of a gas displacement system and deflation of the membrane.
Figure 21:
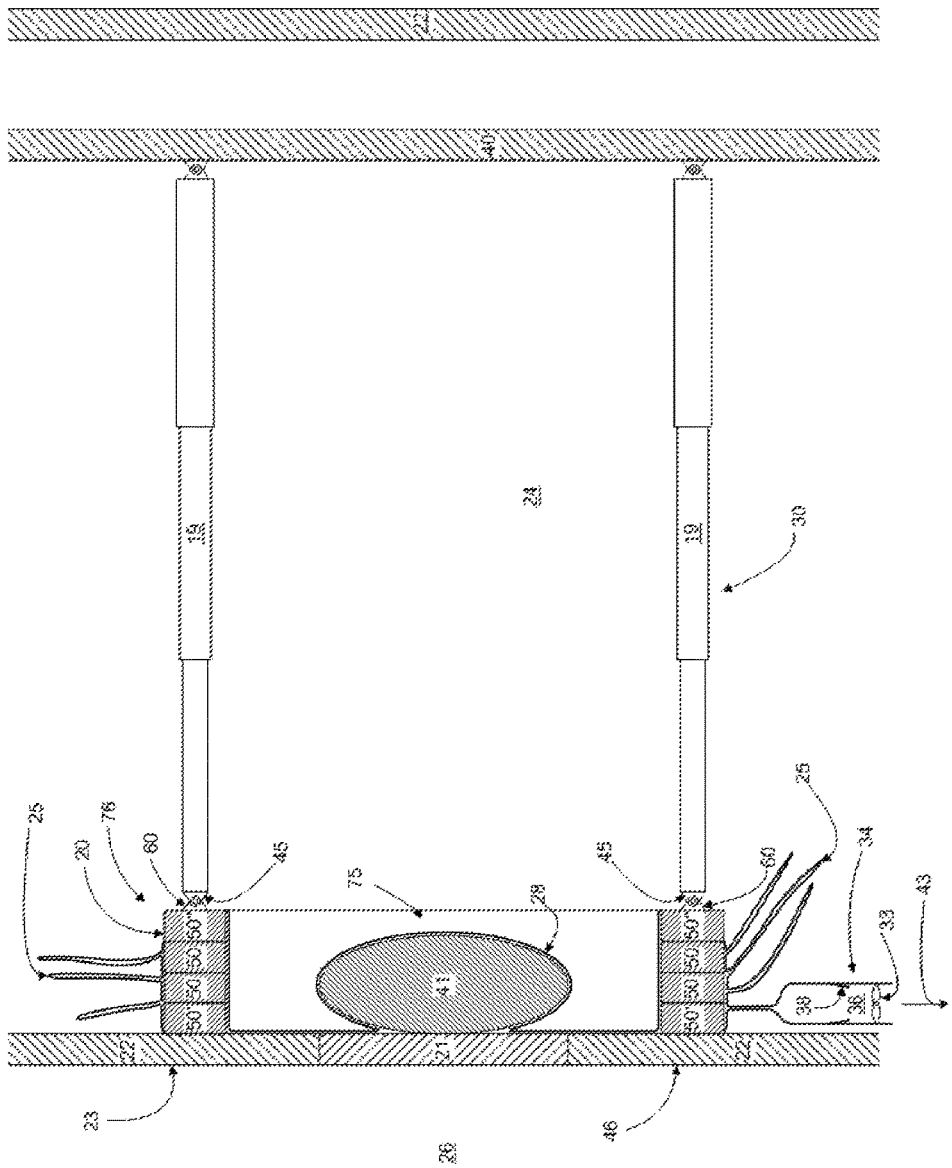
FIG. 21 is a fragmentary, side elevation view, in cross-section, of the conformal lock assembly of FIG. 19, illustrating the membrane in the deflated condition with the actuator devices in an extended condition.
Figure 22:
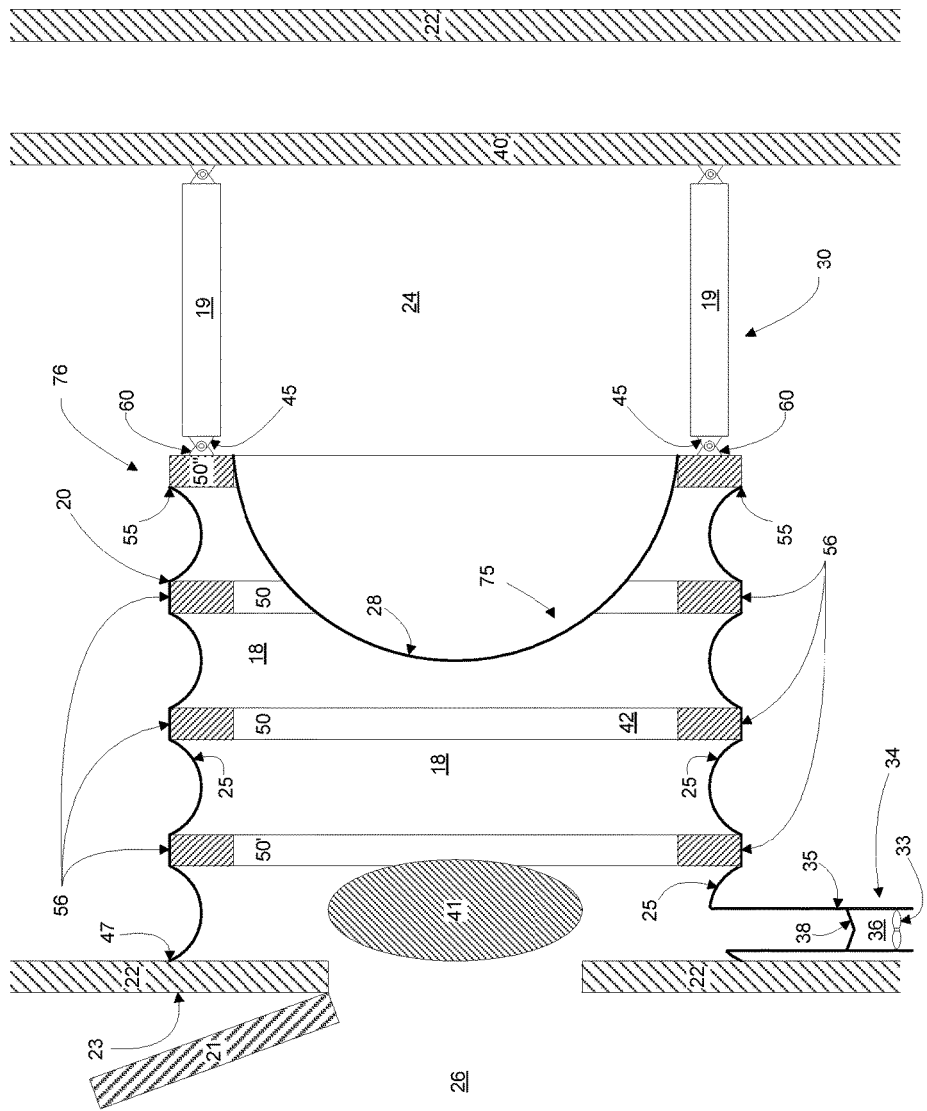
FIG. 22 is a fragmentary, side elevation view of the conformal lock assembly of FIG. 21, illustrating movement of the door to an opened condition.

Turning now to FIGS. 16-18, the actuation system 30 is provided by one or more retractor actuators 61, as compared to the extensors of the previous embodiment of FIGS. 1-14. In this configuration, each actuator has one end coupled to the outermost rib structure 50″ in a spaced-apart manner at the corresponding attachment points 60, via link 45, and opposite ends anchored to an object sufficiently stable, such as a bulkhead or similar support structure 40 fixed within the interior 24 of the hull body 46 of the spacecraft 23. Such a rigid support structure 40 must be sufficiently strong to withstand such loads, and enable proper operation of the actuator devices and enable relative movement of the respective one ends.

More particularly, these retractor actuators 19 are extended to move the outer-most rib structure 50″, and thus the plurality of rib structures from the spaced condition (FIG. 16) to the stacked, collapsed condition (FIG. 17), and then can be retraced to move the plurality of rib structures 50′, 50, 50″ back to the displaced condition, while moving the membrane assembly to the displaced condition (FIG. 18), creating a vacuum and the operation volume 18 of the airlock assembly.

In another specific embodiment, turning now to FIGS. 19-22, a primary portion of the membrane assembly 76 is detached from the rib structures 50, and the rib structures are for the most part disposed completely within the membrane assembly 76 itself, rather than forming an integral portion thereof like the previous embodiments provide. In this configuration, the rib structures 50 are relatively free floating within the membrane, although the adjacent respective rib structures are attached together through a cable or the like (not shown). Again the maximum axial displacement relative to one another is fixed while permitting axial stacking therebetween, when moving toward a stacked condition (i.e., when moving from spaced condition of FIG. 19 to the stacked condition of FIG. 20).

As best shown in FIGS. 10-12, the membrane assembly 76 is essentially comprised of a single membrane section 25, having a proximal end portion airtight mounted to the door-side support wall 22 and an opposite section mounted to the distal most rib structure 50". With respect to the second end section 28 of the membrane assembly 76, this portion can be sealed to the upper surface 70 of the same, and is essentially identical to that of the embodiment shown in FIGS. 1-14. When the membrane assembly 76 is moved from the deflated, collapsed condition of FIG. 21 to the displaced condition (FIG. 22), creating the low pressure space 18, the membrane section 25 is stretched over the outer circumferential surface of the respective rib structure 50, at membrane stretched portions 56.

Figure 23:
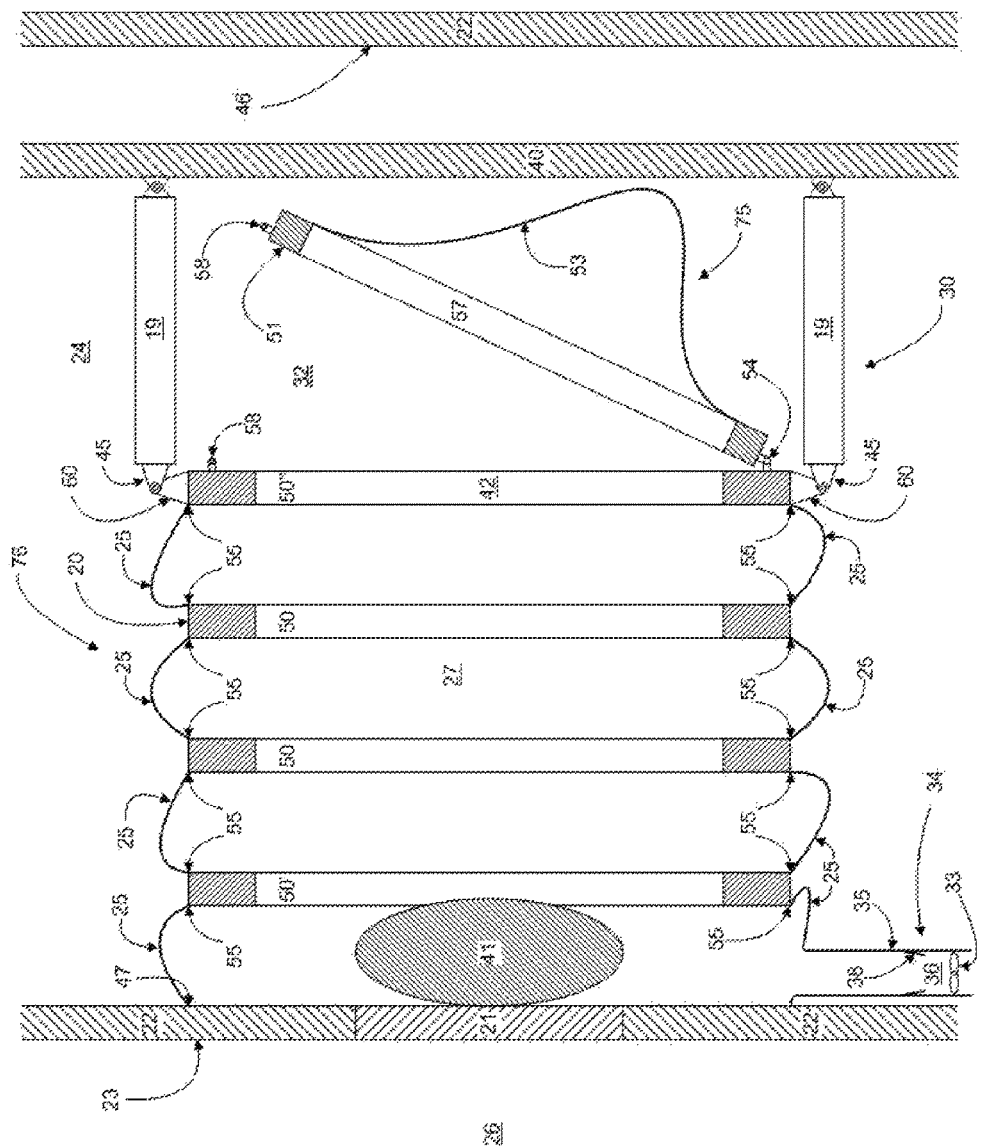
FIG. 23 is a fragmentary, side elevation view, in cross-section, of another alternative embodiment of the conformal lock assembly of FIG. 1, illustrating an object placed within an interior pocket of the membrane.
Figure 24:
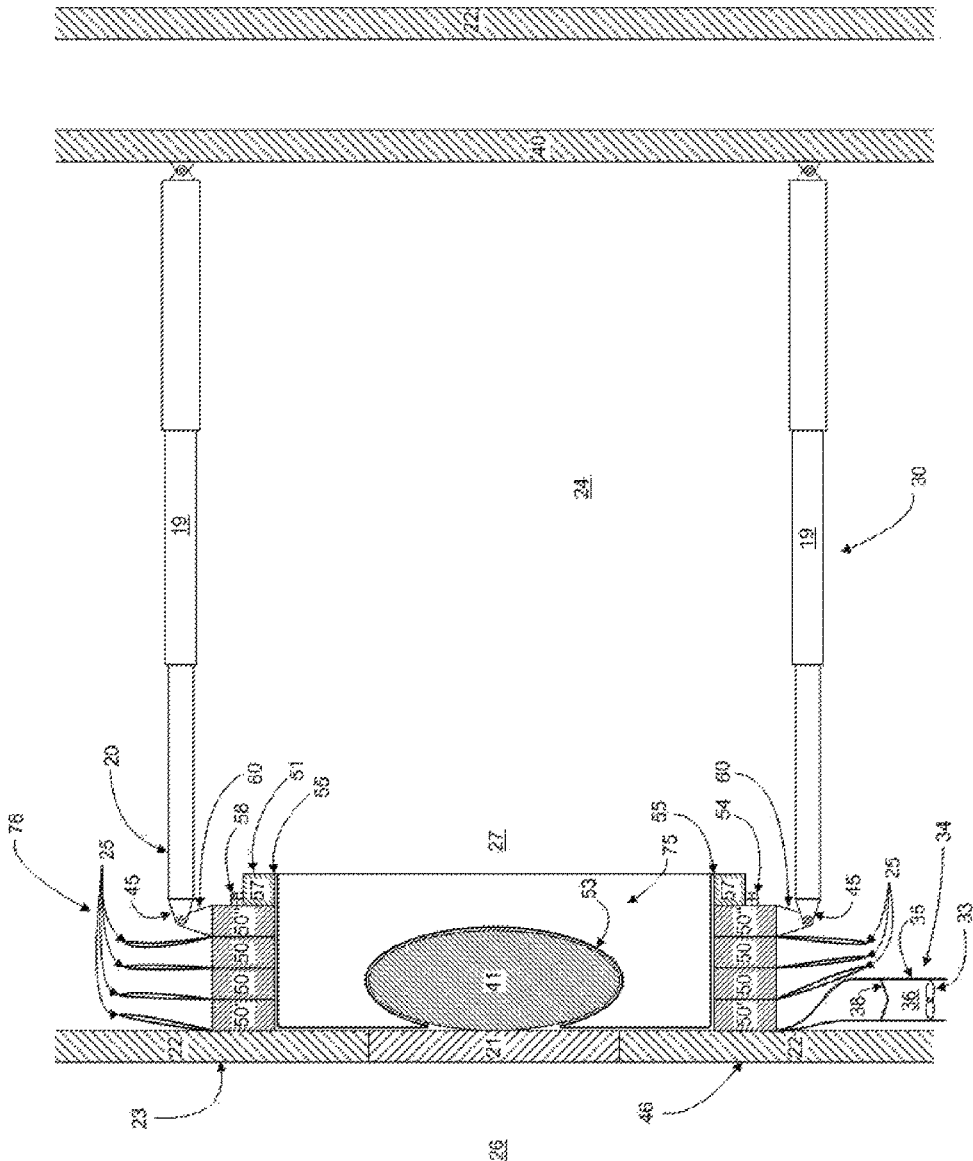
FIG. 24 is a fragmentary, side elevation view, in cross-section, of the conformal lock assembly of FIG. 23, illustrating the membrane in the deflated condition with the actuator devices in an extended condition.
Figure 25:
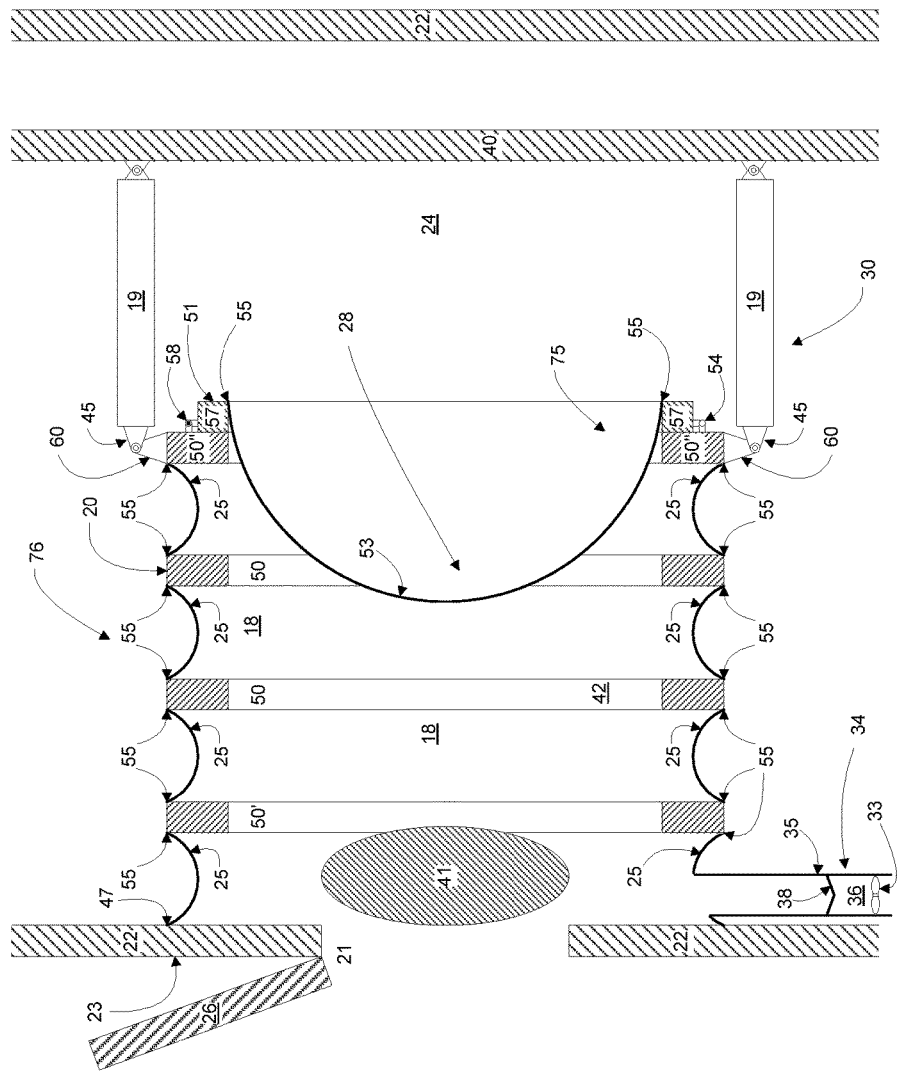
FIG. 25 is a fragmentary, side elevation view of the conformal lock assembly of FIG. 24, illustrating movement of the door to an opened condition.

In still another alternative embodiment, the sealable gateway assembly 75 includes a hinged latch mechanism that cooperates with the second end portion 28 of the membrane assembly 76 to provide internal access to the interior pocket 27 when the airlock is in the inflated/spaced condition. FIGS. 23-25 illustrate this inner hatch concept which includes a rigid hatch frame 57 that defines a passage therethrough. The hatch frame 57 is hingeably mounted (via hinges 54) to the distal-most rib structure 50" between an opened condition (FIG. 23) and a closed condition (FIGS. 24 and 25), airtight sealing the bottom surface of the hatch frame 57 to the upper surface 70 of the rib structure 50. A latch 58 locks the hatch in the closed condition.

The passage through the hatch frame 57 is generally co-axially aligned with the opening 32 through the distal-most rib structure 50", in the closed condition, and enables a hatch membrane 53 or second end of the membrane assembly 76 to extend therethrough, and conform around the object 41, when in the deflated condition (FIG. 24).

It will be understood that while this hatch embodiment is shown hingeably mounted to the rib structure 50", any mounting mechanism can be applied that allows the hatch frame 57 to be removed and subsequently re-sealed.

Moreover, it will be appreciated that while the sealable gateway assembly 75 has been shown and described as being associated with the second end portion of the membrane assembly and/or the distal-most rib structure, the gateway may be oriented anywhere along the membrane assembly. For example, the gateway assembly may be positioned between any two adjacent rib structures, or even between the support wall and the proximal-most rib structure.

Figure 26:
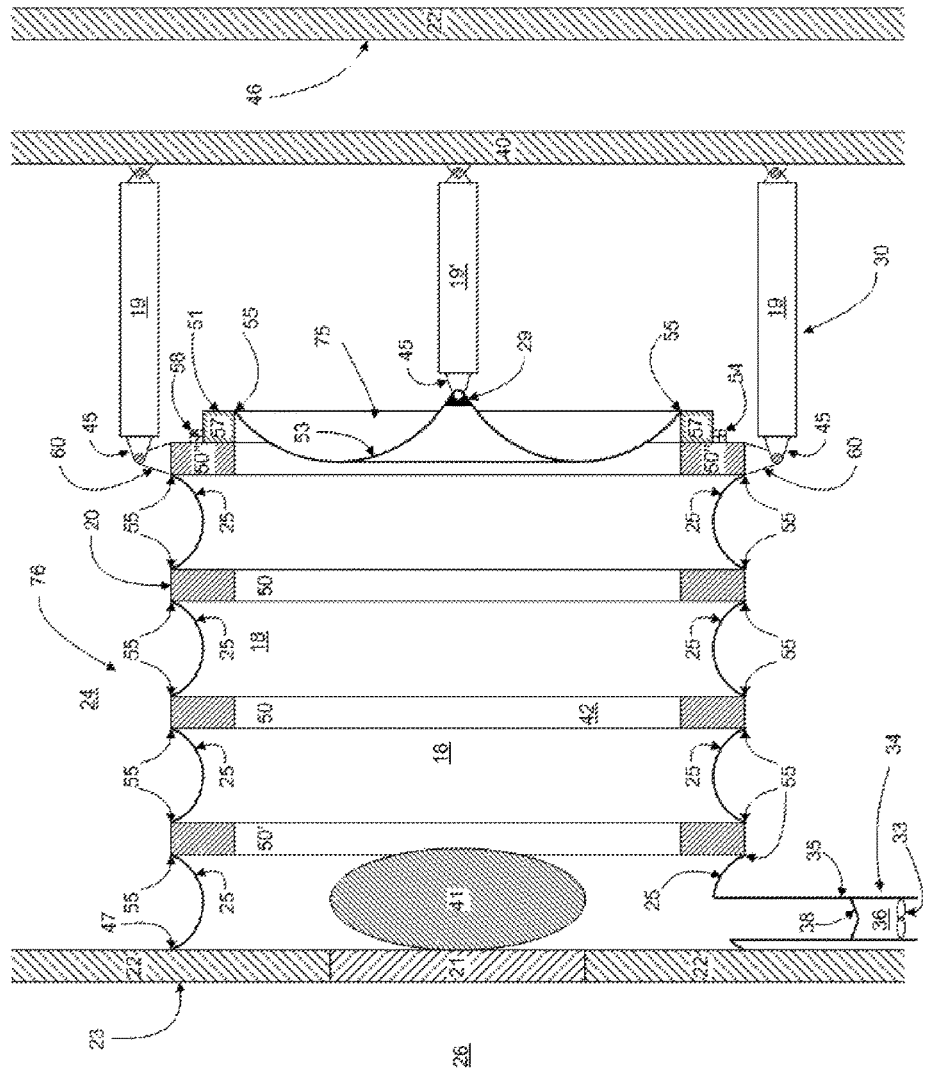
FIG. 26 is a fragmentary, side elevation view, in cross-section, of yet another alternative embodiment of the conformal lock assembly of FIG. 1, illustrating operation of an actuation system to move the membrane from the deflated condition to a displaced condition.

Another alternative embodiment, as illustrated in FIG. 26, shows a central retractor actuator 19' of the actuation system 30 mounted to a central portion of the hatch membrane 53 via link 45 and attachment point 29. This embodiment is shown stretching the plurality of rib structures 50 to the spaced condition, via retracting retractors 19 and 19', which in turn pulls the membrane assembly 76 to the displaced condition to create the vacuum and the operational volume 18 of the airlock 18.

In yet one last embodiment (FIG. 27), the actuator devices of the actuator system 30 may be disposed within the interior pocket 27 (i.e., interstitial actuators 59) of the airlock assembly 20 when the membrane assembly 76 is in the inflated condition. Although a single interstitial actuator can be applied, in this illustration, each actuator side is comprised a plurality of interstitial actuators 59 interconnected in an end-to-end arrangement, one interstitial actuator essentially for, or between, each rib structure 50.

Similar to a single actuator embodiment for each side, the multiple end-to-end interstitial actuators 59 cooperate to extend the rib structures 50 in the spaced condition of FIG. 27. Hence, in this configuration, the end-to-end interstitial actuators 59 are collectively retracted to move the plurality of rib structures to an axially stacked condition, and are collectively extended when membrane assembly 76 is in either the inflated condition or when creating a vacuum in the low pressure space 18 from the deflated condition.

These actuators can be any type mechanism capable of displacing the membrane away from the hull wall under these loads, depending upon the number of actuators, and desired level of the negative pressure created. Such systems include pneumatic, hydraulic, screw jack, cable driven mechanisms, etc., to name a few. Moreover, it will be appreciated, that multiple end-to-end actuators could be applied external to the membrane as well.

While this invention has been described in terms of several preferred embodiments, there are alteration, permutations, and equivalents which fall within the scope of this invention. For example, the airlock assembly of the present invention may be utilized for ingress and egress for a clean room. This could be made from two membranes, instead of a hull wall and a membrane. In this embodiment, there would be no need for the actuators. In another application, the airlock assembly may have underwater applications, such as for ingress and egress for a submarine. In this application, "inside" and "outside" would be reversed in the figures. Moreover, the airlock assembly could also be applied to the field of environmental containment. This could be to keep contaminants inside a contaminated space, and/or retain contaminants out of an uncontaminated space. For example, the present invention may be applied for battlefield vehicles during a chemical or biological attack. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:
1. An interiorly deployed conformal airlock assembly for ingress and egress through a door of a support wall from a relatively high pressure environment on one side of the support wall to a relatively low pressure environment on the other side of the support wall, said airlock assembly including:
   a distal-most rigid, rib structure having an upper surface, an opposite lower surface, a circumferential outer wall and a circumferential inner wall defining a rib interior space, said rib structure being generally disposed on the one side of the support wall;

a flexible, gas impermeable membrane assembly cooperating with the distal-most rib structure and said interior space to form an interior pocket over the door on the one side of the support wall, said membrane assembly further having a first end portion cooperating with the support wall in an airtight manner, and an opposite second end portion extending over said interior pocket defined by the upper surface of said distal-most rib structure;

a sealable gateway assembly cooperating with at least one of said membrane assembly and said distal-most rib structure for selective operation thereof between an open condition, permitting passage through an opening into the interior pocket, and a closed condition, forming an airtight seal;

a gas displacement system in flow communication with the interior pocket, and selectively operable to flow air into said interior pocket toward an inflated condition of the membrane assembly, and to flow air out of said interior pocket toward a deflated condition for the membrane assembly; and an actuator apparatus coupled to said distal-most rib structure, and configured to displace said flexible membrane and the distal-most rib structure into and against the high pressure environment, in the deflated condition, interiorly away from said one side of the support wall toward a displaced condition, and to generate a low pressure space within said interior pocket as the flexible membrane is increasingly displaced toward the displaced condition, until the pressure differential between the low pressure created in the low pressure space and that on the other side of the support wall are sufficiently low so as to enable safe and free opening of the door to permit ingress and egress therethrough;

said rib structure further being configured to accommodate significant compressive forces exerted by said membrane assembly during the generation of said low pressure space.

2. The conformal airlock assembly as recited in claim 1, wherein
said actuator apparatus includes one or more actuator devices, each having one end coupled to the distal-most rib structure at spaced-apart locations thereof, and each having opposite ends fixedly mounted to a support structure to one of push and pull the membrane assembly.

3. The conformal airlock assembly as recited in claim 1, wherein
said second end portion of said gas impermeable membrane assembly being mounted to the upper surface of the distal-most rib structure in an airtight manner surrounding the rib interior space thereof, said sealable gateway includes an airtight resealable seam cooperating with the second end portion membrane to form said opening into the interior pocket, said resealable seam selectively operable from said open condition, permitting passage through said opening and into the interior pocket, to said closed condition, forming said airtight seal.

4. The conformal airlock assembly as recited in claim 3, wherein
said resealable seam is provided by one of a resealable airtight fabric edge fastener, fabric edge joiner, and interlocking tooth fastener device.

5. The conformal airlock assembly as recited in claim 1, wherein said gas displacement system includes a 2-way valve to selectively permit the passage of air through the displacement system.

6. The conformal airlock assembly as recited in claim 1, wherein
said gas displacement system cooperates with one of the flexible membrane and the support wall to permit the flow of air therethrough.

7. The conformal airlock assembly as recited in claim 1, further including:
a proximal-most rigid, rib structure having an upper surface, a respective opposite, lower surface, a circumferential outer wall and a circumferential inner wall defining a rib interior space, said rib structure being generally disposed in said interior pocket between said one side of the support wall and said distal-most rib structure, wherein, in said inflated condition, said distal-most rib structure and said proximal-most rib structure are spaced apart, and in said deflated condition, said distal-most rib structure and said proximal-most rib structure are in a stacked condition.

8. An interiorly deployed conformal airlock assembly for ingress and egress through a door of a support wall from a relatively high pressure environment on one side of the support wall to a relatively low pressure environment on the other side of the support wall, said airlock assembly including:

a plurality of separate, rigid, rib structures comprising at least a proximal-most rib structure and a distal-most rib structure, each of said rib structure having an upper surface, an opposite lower surface, a respective circumferential outer wall and a respective circumferential inner wall defining a respective rib interior space, said rib structures being generally disposed on the one side of the support wall generally co-axially aligned with one another from said proximal-most rib structure to said distal-most rib structure of the plurality of rib structures;

a flexible, gas impermeable membrane assembly cooperating with the respective plurality of rib structures and their respective interior space to form an interior pocket over the door on the one side of the support wall, said membrane assembly further having a first end portion cooperating with the support wall in an airtight manner, and an opposite second end portion extending over said interior pocket defined by the respective upper surface of said distal-most rib structure;

a sealable gateway assembly cooperating with at least one of the membrane assembly and the plurality of rib structures structure for selective operation thereof between an open condition, permitting passage through an opening into said interior pocket, and a closed condition, forming an airtight seal;

a gas displacement system in flow communication with the interior pocket, and selectively operable to flow air into said interior pocket toward an inflated condition of the membrane assembly, wherein the plurality of rib structures are spaced apart, and to flow air out of said interior pocket toward a deflated condition for the membrane assembly, wherein said plurality of rib structures are in a stacked condition; and an actuator apparatus coupled to said distal-most rib structure, and configured to displace said flexible membrane and the plurality of rib structures into and against the high pressure environment, in the deflated condition, interiorly away from said one side of the support wall toward a displaced condition, and to generate a low pressure space within said interior pocket as the flexible membrane is increasingly displaced toward the displaced condition, until the pressure differential between the low pressure created in the low pressure space and that on the other side of the support wall are sufficiently low so as to enable safe and free opening of the door to permit ingress and egress therethrough;

said rib structures further being configured to accommodate significant compressive forces exerted by said membrane assembly during the generation of said low pressure space.

9. The conformal airlock assembly as recited in claim 8, wherein
the plurality of rib structure include at least one separate, rigid rib structure disposed between the proximal-most rib structure and the distal-most rib structure.

10. The conformal airlock assembly as recited in claim 8, wherein
said gas impermeable membrane assembly includes:
a plurality of ring-shaped membrane sections, each having one end mounted to a respective rib structure in an airtight manner, and an opposite end mounted to a respective adjacent rib structure in an airtight manner, and
a proximal-most ring-shaped membrane section comprising said first end portion, and an opposite end;
said first end portion of the membrane assembly cooperating with said support wall in said airtight manner, and
said opposite end mounted to said proximal-most rib structure.

11. The conformal airlock assembly as recited in claim 8, wherein
said gas impermeable membrane includes a metallic reinforced backing.

12. The conformal airlock assembly as recited in claim 8, wherein
said second end portion of said gas impermeable membrane assembly being mounted to the upper surface of the distal-most rib structure in an airtight manner surrounding the rib interior space thereof, said sealable gateway includes an airtight resealable seam cooperating with the second end portion membrane to form said opening into the interior pocket, said resealable seam selectively operable from said open condition, permitting passage through said opening and into the interior pocket, to said closed condition, forming said airtight seal.

13. The conformal airlock assembly as recited in claim 12, wherein
said resealable seam is provided by one of a resealable airtight fabric edge fastener, fabric edge joiner, and interlocking tooth fastener device.

14. The conformal airlock assembly as recited in claim 13, wherein
said airtight resealable seam further includes one of an overlapping metallic hook system and an airtight hook and loop component.

15. The conformal airlock assembly as recited in claim 8, wherein
said sealable gateway includes a relatively rigid hatch frame hingeably mounted to said distal-most rib structure between said opened condition and said closed condition, airtight sealing a lower surface of said hatch frame to the upper surface of said distal most rib structure.

16. The conformal airlock assembly as recited in claim 15, wherein
said hatch frame further includes a upper surface, opposite said lower surface, a respective circumferential outer wall and a respective circumferential inner wall defining a hatch interior space such that said hatch frame is generally co-axially aligned with said plurality of rib structures when oriented in said closed condition, and
said second end portion of said gas impermeable membrane assembly being mounted to the upper surface of said hatch frame in an airtight manner surrounding the hatch interior space thereof.

17. The conformal airlock assembly as recited in claim 8, wherein
said actuator apparatus includes one or more actuator devices, each having one end coupled to the distal-most rib structure at spaced-apart locations thereof, and each having opposite ends fixedly mounted to a support structure to one of push and pull the membrane assembly.

18. The conformal airlock assembly as recited in claim 17, wherein
said one end of said actuator devices are coupled to the distal-most rib structure from one of:
inside said interior pocket to push the membrane assembly away from the door, to create the lower pressure space; and
outside said interior pocket to pull the membrane assembly away from the door, to create the lower pressure space.

19. A method for ingress and egress through a door of a support wall for vehicles, modules and structures from a relatively high pressure environment inside the support wall to a relatively low pressure environment outside the support wall, said method including:
providing a flexible, gas impermeable membrane that cooperates with the support wall in an airtight manner to form an interior pocket over the door on the inside high pressure environment side of the support wall;
providing a distal-most rigid rib structure, having an upper surface, an opposite lower surface, a circumferential outer wall and a circumferential inner wall defining a rib interior space, into said interior pocket and mounted to said impermeable membrane;
displacing air from within the interior pocket of the membrane from an inflated condition toward a deflated condition, collapsing the membrane about the door on the inside of the support wall; and
after said displacing air, displacing said distal-most rib structure interiorly and away from said support wall, which in turn displaces said flexible membrane into and against the high pressure environment, in the deflated condition, interiorly away from the door on the inside of the support wall toward a displaced condition, and generating a low pressure space within said interior pocket as the flexible membrane is increasingly displaced toward the displaced condition, until the pressure differential between the low pressure created in the low pressure space and that on the other side of the support wall are sufficiently low so as to enable safe and free opening of the door, enabling opening of the door of the support wall to permit one of ingress and egress therefrom.

* * * * *